United States Patent
Cattle et al.

(10) Patent No.: US 11,965,955 B2
(45) Date of Patent: Apr. 23, 2024

(54) RADAR-BASED IMAGING SYSTEMS AND METHODS

(71) Applicant: KMB Telematics, Inc., Arlington, VA (US)

(72) Inventors: Bryan Cattle, Arlington, VA (US); Jasmin A. Mahal, Herndon, VA (US); Jeremy Johnston, Miami, FL (US)

(73) Assignee: KMB TELEMATICS, INC., Washington, DC (US)

( * ) Notice: Subject to any disclaimer, the term of this patent is extended or adjusted under 35 U.S.C. 154(b) by 0 days.

(21) Appl. No.: 17/940,810

(22) Filed: Sep. 8, 2022

(65) Prior Publication Data

US 2023/0059523 A1     Feb. 23, 2023

Related U.S. Application Data

(63) Continuation of application No. 16/688,282, filed on Nov. 19, 2019, now Pat. No. 11,448,754.

(60) Provisional application No. 62/769,824, filed on Nov. 20, 2018.

(51) Int. Cl.
*G01S 13/90*     (2006.01)
*G01S 13/931*    (2020.01)

(52) U.S. Cl.
CPC ...... *G01S 13/9029* (2013.01); *G01S 13/9058* (2019.05); *G01S 13/931* (2013.01)

(58) Field of Classification Search
None
See application file for complete search history.

(56) References Cited

U.S. PATENT DOCUMENTS

2019/0302253 A1 * 10/2019 Santra ............... G01S 13/88

FOREIGN PATENT DOCUMENTS

WO     2018147929 A2     8/2018

OTHER PUBLICATIONS

Winkler, Volker; "Range Doppler Detection for automotive FMCW Radars"; 2007 EuMA; Oct. 2007; pp. 166-169.
Ziankl, Dominik, et al.; "BLASTDAR—A Large Radar Sensor Array System for Blast Furnace Burden Surface Imaging"; IEE Sensors Journal; vol. 15, No. 10; October.
Zankl, Dominik, et al.; "What a Blast!"; IEEE Microwave Magazine; September/Oct. 2017; pp. 52-69.

(Continued)

*Primary Examiner* — Whitney Moore
(74) *Attorney, Agent, or Firm* — NOVAK DRUCE CARROLL LLP

(57) ABSTRACT

In some examples, a radar system comprises a plurality of antenna elements spatially distributed to form a sparse antenna array orthogonal to a range dimension of the radar imaging system, wherein the plurality of antenna elements are configured to transform a plurality of independent radar signals for a field of view. The system can also include an image processing system that is configured to recover interaction information gained from interaction of the plurality of independent radar signals with the field of view; use the interaction information to identify radar imaging data about the field of view; and form one or more three-dimensional (3D) voxels of the field of view using the radar imaging data.

46 Claims, 14 Drawing Sheets

(56) References Cited

OTHER PUBLICATIONS

Zhuge, Xiaodong; "Short-Range Ultra-Wideband Imaging with Multiple-Input Multiple-Output Arrays"; Dissertation at Delft University of Technology; 2010; pp. 1-227.

Zankl, Dominik, et al.; "Radar Array Self-Calibration and Imaging with Applications to Bulk Material Gauging"; GeMiC 2016; Mar. 14-16, 2016; pp. 313-316.

International Search Report & Written Opinion; PCT Application No. PCT/US2019/062424; dated Jul. 6, 2020.

Ahmed, Sherif Sayed Aboelyazeed; "Electronic Microwave Imaging with Planar Multistatic Arrays" (two parts); Thesis accepted by Faculty of Engineering; Date Apr. 26, 2013.

Ahmed, Sherif Sayed, et al.; "A Novel Fully Electronic Active Real-Time Imager Based on a Planar Multistatic Sparse Array"; IEEE Transactions on Microwave Theory and Techniques; vol. 59, No. 12; Dec. 2011; pp. 3567-3576.

Ahmed, Sherif Sayed, et al.; "Advanced Microwave Imaging"; IEEE Microwave Magazine; Sep. 13, 2012; pp. 26-43.

Bechter, Jonathan, et al.; "Compensation of Motion-Induced Phase Errors in Tom Mimo Radars"; IEEE Microwave And Wireless Components Letters; vol. 27, No. 12; Dec. 2017; pp. 1164-1166.

Biallawons, Oliver, et al.; "Improved UAV Detection with the MIMO Radar MIRA-CLE Ka using Range-Velocity Processing and TOMA Correction Algorithms"; The 19th International Radar Symposium IRS; Jun. 20-22, 2018; pp. 1-10.

Biallawons, Oliver, et al.; "MIMO concept for the imaging radar of the radar warning and information system RAWIS"; 11th European Conference on Synthetic Aperture Radar; 2016; pp. 75-78.

Biallawons, Oliver; "Realization and calibration of the MIMO radar MIRA-CLE Ka"; International Journal of Microwave and Wireless Technologies; 2014; pp. 405-413.

Bleh, D., et al.; "A 100 GHz FMCW MIMO radar system for 3D image reconstruction"; Proceedings of the 13th European Radar Conference; Oct. 5-7, 2016; pp. 37-40.

Bleh, Daniela Karina; W-Band FMCW MIMO radar demonstrator system for 3D imaging; Dissertation; Mar. 20, 2017; pp. 1-119.

Bleh, Daniela, et al.; W-Band Time-Domain Multiplexing FMCW MIMO Radar for Far-Field 3-D Imaging; IEEE Transactions on Microwave Theory and Techniques; 2017 IEEE; pp. 1-11.

Bliss, D.W., et al.; "Multiple-Input Multiple-Output {MIMO) Radar and Imaging: Degrees of Freedom and Resolution"; IEEE 2003; pp. 54-59.

Brooker, Graham, et al.; "Using the Polarization of Millimeter-wave Radar as a Navigation Aid"; Journal of Field Robotics; 32(1); 2015.

Ender, Joachim, H.G., et al.; "System architectures and algorithms for radar imaging by MIMO-SAR"; 2009 IEEE; pp. 1-6.

Feger, R., et al.; "Low-Cost Implementation of a Millimeter Wave Imaging System Operating in W-Band"; 2013 IEEE; pp. 1-4.

Feger, Reinhard, et al.; "A 77-GHz FMCW MIMO Radar Based on an SiGe Single-Chip Transceiver"; IEEE Transactions on Microwave Theory and Techniques; vol. 57, No. 5; May 2009; pp. 1020-1035.

Guetlein, Johanna, et al.; "Calibration Strategy for a TDM FMCW MIMO Radar System"; IEEE International :; Conference on Microwaves Communications; Oct. 2013; pp. 1-5.

Guetlein, Johanna, et al.; "Motion Compensation for a TDM FMCW MIMO Radar System"; Proceedings of the 10th European Radar Conference; Oct. 9-11, 2013; pp. 37-40.

Guetlein, Johanna, et al.; "Switching Scheme for a FMCW-MIMO Radar on a Moving Plateform"; Proceedings of the 9th European Radar Conference; Oct. 31-Nov. 2, 2012; pp. 91-94.

Guvenc, Ismail, et al.; "Detection, Localization, and Tracking of Unauthorized UAS and Jamemrs"; https:/ntrs.nasa.gov/search.jsp?R=20170009465; pp. 1-10.

Hakobyan, Gor; "Orthogonal Frequency Division Multiplexing Multiple-Input Multiple-Output Automotive Radar with Novel Signal Processing Algorithms"; 2018; pp. 1-188.

Heidenreich, Philipp; "Antenna Array Processing: Autocalibration and Fast High-Resolution Methods for Automotive Radar".

Huang Y.; "FMCW Based Mimo Imaging Radar for Maritime Navigation"; Progress In Electromagnetics Research; vol. 115, 327-342, 2011; pp. 327-342.

Huang, Penghui, et al.; "Ground Maneuvering Target Imaging and High-Order Motion Parameter Estimation Based On Second-Order Keystone and Generalized Hough-HAF Transform"; IEEE Transactions on Geoscience and Remote Sensing; pp. 1-16.

Huang, Penghui, et al.; "Long-Time Coherent Integration for Weak Maneuvering Target Detection and High-Order Motion Parameter Estimation Based on Keystone Transform"; IEEE Transactions on Signal Processing; 2016; pp. 1-15.

Jahn, Martin, et al.; "A Four-Channel 94-GHz SiGE-Based Digital Beamforming FMCW Radar"; IEEE Transactions on Microwave Theory and Techniques; vol. 60, No. 3; Mar. 2012; pp. 861-869.

Klare, Jens, et al.; "Detection of UAVs using the MIMO radar MIRA-CLE Ka"; 11th European Conference on Synthetic Aperture Radar; pp. 731-734.

Klare, Jens, et al.; "First Experimental Results with the Imagining MIMO Radar MIRA-CLE X"; European Conference On Synthetic Aperture Radar, 2010; pp. 374-377.

Klare, Jens, et al.; "MIRA-CLE X: A new Imaging MIMO-Radar for Multi-Purpose Applications"; Proceedings of the 7th European Radara Conference; Sep. 30-Oct. 1, 2010; pp. 129-132.

Klare, Jens, et al.; "UAV detection with MIMO radar"; The 18th International Radar Symposium; Jun. 28-30, 2017; pp. 1-8.

Lee, J.-S., et al.; "Automated Terrain Classification Using Polarimetric Synthetic Aperture Radar"; Remote Sensing; 2005 NRL Review; pp. 203-205.

Li, Jian, et al.; "MIMO Radar with Colocated Antennas"; IEEE Signal Processing Magazine; Sep. 2007; pp. 106-114.

Li, Yang, et al.; "Range Migration Compensation and Doppler Ambiguity Resolution by Keystone Transform"; 2006 IEEE; pp. 1-4.

Patole, Sujeet, et al.; "Automotive Radars"; Signal Processing For Smart Vehicle Technologies: Part 2; ISSS Signal Processing Magazine; Mar. 2017; pp. 22-35.

Perry, R.P., et al.; "Coherent Integration With Range Migration Using Keystone Formatting"; The MITRE Corp.; pp. 1-6.

Perry, R.P., et al.; "SAR Imaging of Moving Targets"; IEEE Transactions on Aerospace and Electronic Systems; vol. 35, No. 1; Jan. 1999; pp. 188-200.

Qiong, Le, et al.; "An Overview of Self-Calibration in Sensor Array Processing"; IEEE 2003; pp. 279-282.

Rambach, Kilian; "Direction of Arrival Estimation Using a Multiple-Input-Multiple-Output Radar with Applications to Automobiles"; 2017; pp. 1-213.

Rankin, G.A., et al.; "Radar Imaging: Conventional and MIMO"; 2012 IEEE; pp. 171-176.

Rankin, Gerard, et al.; "Millimeter Wave Array for UAV Imaging MIMO Radar"; Conference: International Radar Symposium; Jun. 2015; pp. 1-6.

Richards, Mark A.; "The Keystone Transformation for Correcting Range Migration in Range-Doppler Processing"; Mar. 28, 2014; pp. 1-29.

Rohling, Hermann, et al.; "Continuous waveforms for automotive radar systems"; 2012 Institution of Engineering anc Technology; pp. 173-205.

Schiessl, Andreas, et al.; "Phase Error Sensitivity in Multistatic Microwave Imaging Systems"; Proceedings of the 43rd European Microwave Conference; Oct. 7-10, 2013; pp. 1631-1634.

Schmid, Christian M., et al.; "Motion Compensation and Efficient Array Design for Toma Fmcw Mimo Radar Systems"; 6th European Conference on Antennas and Propagation; 2011 IEEE; pp. 17 46-1750.

Spreng, Thomas, et al.; "UWB Near-Field MIMO Radar: Calibration, Measurements and Image Reconstruction"; Proceedings of the 10th European Radar Conference; Oct. 9-11, 2013; pp. 33-36.

Sun, Hongbo, et al.; "Analysis and Comparison of MIMO Radar Waveforms"; 2014 International Radar Conference; IEEE; pp. 1-6.

Ulan Der, Lars, M.H., et al.; "Synthetic-Aperture Radar Processing Using Fast Factorized Back-Projection"; IEEE Transactions on Aerospace and Electronic Systems; vol. 39, No. 3; Jul. 2003; pp. 760-776.

(56) References Cited

OTHER PUBLICATIONS

Van Dorp, Philip; "LFMCW based MIMO imaging processing with Keystone Transform"; Proceedings of the 10th European Radar Conference; Oct. 9-11, 2013; pp. 467-470.
Milden, Helmut, et al.; "MIRA-CLE, an experimental MIMO radar in Ka band"; European Conference on Synthetic Aperture Radar; pp. 382-385.

* cited by examiner

Space-time datacube

FIG. 4
(a) sawtooth
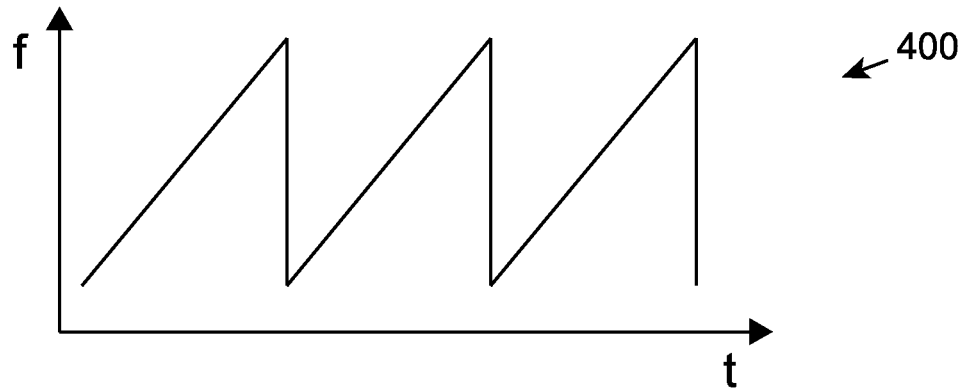
(b) triangle
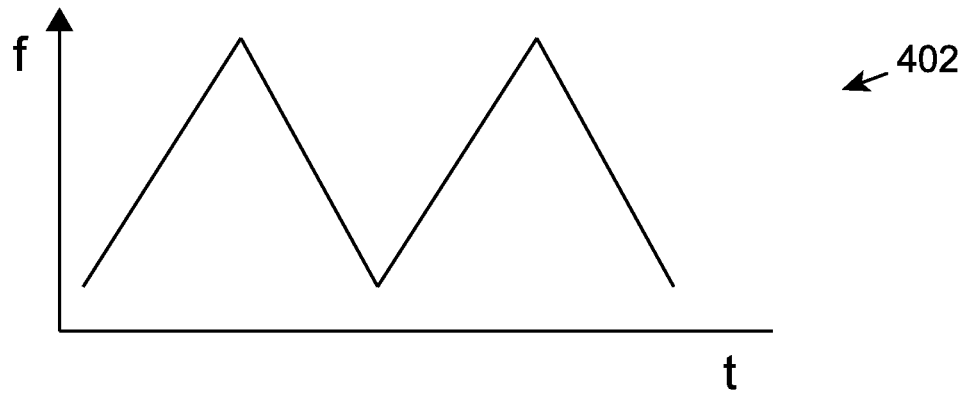
(c) stepped
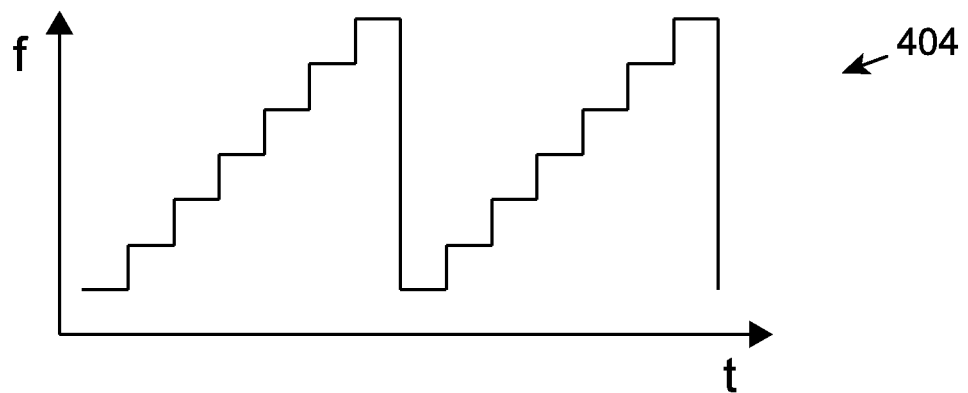

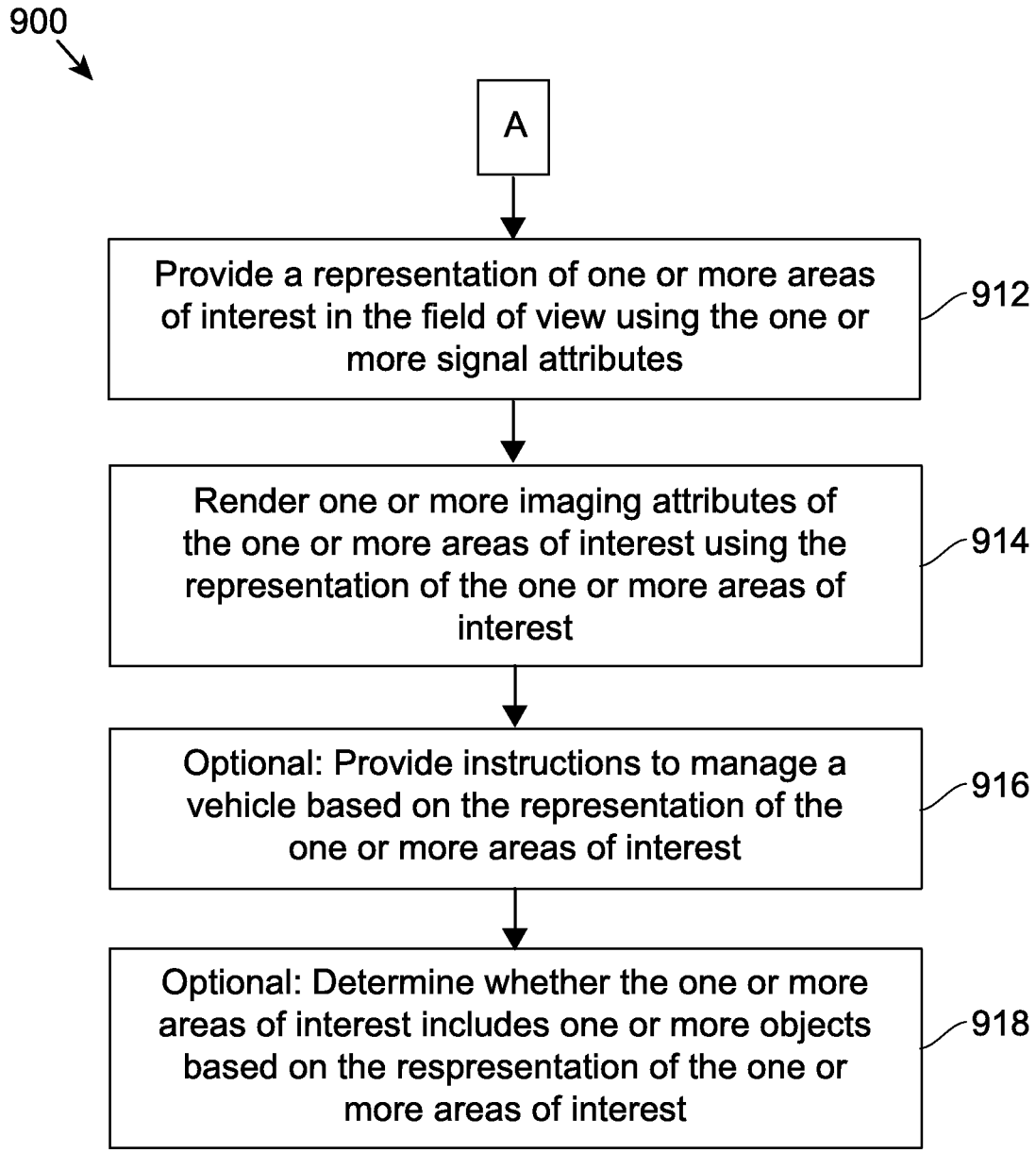

RADAR-BASED IMAGING SYSTEMS AND METHODS

CLAIM OF PRIORITY AND INCORPORATION BY REFERENCE

This application is a continuation application which claims benefit to U.S. Application Ser. No. 16/688,282, filed Nov. 19, 2019, which claims benefit to U.S. Provisional Application No. 62/769,824, filed Nov. 20, 2018 entitled "OBJECT SENSING FROM A POTENTIALLY MOVING FRAME OF REFERENCE WITH VIRTUAL APERTURES FORMED FROM SPARSE ANTENNA ARRAYS" the contents of which are hereby incorporated by reference as if set forth fully herein

TECHNICAL FIELD

The technical field relates to radar imaging systems and methods, and more particularly to radar imaging systems and methods from a potentially moving frame of reference using virtual apertures formed from sparse radar antenna arrays.

BACKGROUND

Advances in technology have allowed for increasingly accurate object sensing within a field of view. In particular, advances in technology have allowed for increasingly accurate 3D object sensing within one or more fields of view. In turn, this has led to advances in numerous fields. One such field is the automotive field. For example, improvements in object sensing have led to advances in collision detection, thereby resulting in safer cars. In another example, improvements in object sensing have led to the development of autonomous cars.

Currently, lidar and computer vision techniques have been used to perform object sensing. However systems that use lidar and computer vision for object detection have many drawbacks. Specifically, the frequency ranges of electromagnetic energy used by lidar and computer vision object detection systems degrade performance of such systems in certain environments and operational scenarios. For example, lidar and computer vision object detection systems have difficulty sensing objects in fog and rain. Further, lidar and computer vision object detection systems are unable to identify scattering properties of objects in an environment. In turn, lidar and computer vision object detection systems are unable to determine characteristics of an object, e.g. a material composition of the object. Additionally, lidar and computer vision object detection systems are unable to identify an instantaneous velocity of a detected object, e.g. for purposes of controlling an automobile based on the velocity of the object. Further, lidar and computer vision object detection systems are unable to detect velocities of objects that are moving slowly (e.g., those moving slowly relative to a fixed frame and/or the velocity of the automobile). While it would be desirable to perform object sensing that improves upon and/or solves one or all of the previously mentioned deficiencies of using lidar and computer vision to perform object sensing, existing systems and methods do not do so.

Further, lidar and computer vision object sensing techniques have many deficiencies in actual implementation in systems for performing object sensing. Specifically, lidar object sensing systems have many moving parts that make such systems prone to failure. Further, lidar object sensing systems utilize expensive components that make such systems difficult for widespread implementation. Additionally, computer vision object sensing systems are difficult to calibrate making such systems difficult to operate. There therefore exist needs for systems for performing object sensing that improve upon or solve one or all of the previously mentioned deficiencies of current lidar and computer vision systems.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 4 shows example waveforms that can be generated by the signal generator(s).

FIGS. 9A and 9B illustrate an example method for performing object sensing and characterization using radar.

DESCRIPTION OF EXAMPLE EMBODIMENTS

Figure 1A:
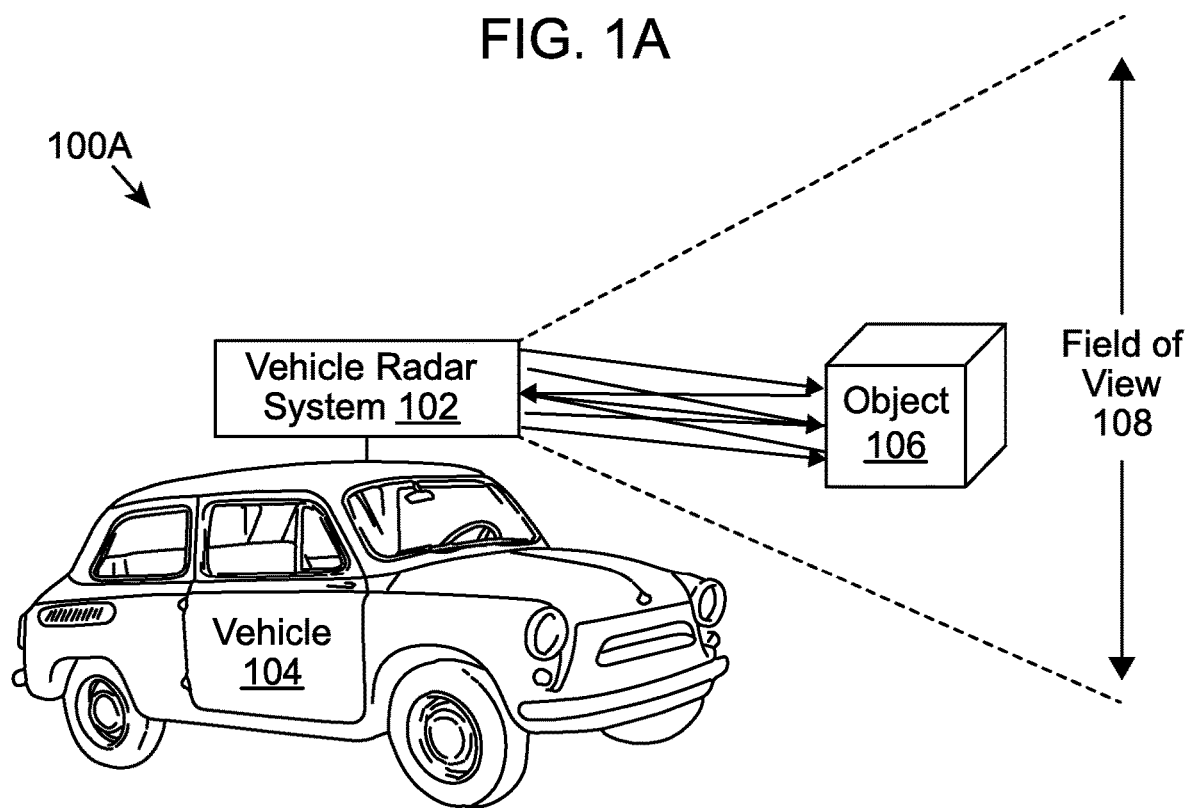
FIG. 1A illustrates an example system of an object sensing system in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are provided that identify various physical properties (3D geometry, speed, radio scattering properties, etc.) of remote objects. The systems described herein can include a new sparse antenna array that measures reflected waves, e.g. millimeter wave radio waves, from objects. The sparse antenna array can allow properties of remote objects to be identified with high resolution, particularly in comparison to other automotive object sensing systems. The systems described herein also have a relatively low parts count, e.g. in relation to other radar applications, such as those applications involving security screening, and e.g. in relation to existing lidar object detection systems. The systems can be configured for automotive and airborne collision detection and avoidance. While the systems, methods, and computer-readable media discussed herein are described with respect to automotive applications, in various embodiments, the systems, methods, and computer-readable media can be used with an applicable application that utilizes object detection and sensing. Specifically, the systems, methods, and computer-readable media described here can be used not only in automotive collision detection/avoidance systems and autonomous vehicular systems, but also in systems that use physical properties of remote objects for capturing traffic or other conditions.

In certain embodiments, a radar imaging system can include a signal generator configured to generate a first plurality of independent waveforms. The system can include a signal conversion module that is configured to convert the first plurality of independent of waveforms into a first plurality of independent transmitted radar signals. A transmitter array comprising a first plurality of transmitter antennas can transmit the first plurality of independent transmitted radar signals toward a field of view. A receiver array comprising a second plurality of receiver antennas can receive a second plurality of receive radar signals representing responses to the first plurality of independent transmitted radar signal from the field of view. Both the transmitter array and the receiver array can be implemented as part of the radar imaging system. The radar imaging system can include a virtual antenna formation module that is configured to combine the second plurality of receive radar signals to form a combined receive radar signal for the field of view. Further, the radar imaging system can include an imaging module that is configured to provide a representation of one or more areas of interest in the field of view using the combined receive radar signal. Specifically, the imaging module can render one or more attributes of the one or more areas of interest using the representation of the one or more areas of interest.

In various embodiments, a method can include generating a first plurality of independent waveforms and converting the first plurality of independent waveforms into a first plurality of independent transmitted radar signals. The first plurality of independent transmitted radar signal can be transmitted towards a field of view using a transmitter array comprising a first plurality of transmitter antennas. An example method can also include receiving a second plurality of receive radar signals using a receive array comprising a second plurality of receive antennas. The second plurality of receive radar signals can represent responses to the first plurality of independent transmitted radar signals from the field of view. An example method can further include combining the second plurality of receive radar signals to form a combined receive radar signal for the field of view. A representation of one or more areas of interest in the field of view can be provided using the combined receive radar signal. Further, one or more attributes of the one or more areas of interest can be rendered using the representation of the one or more areas.

In certain embodiments, a receiver system can include a receiver array comprising a second plurality of receiver antennas configured to receive a second plurality of receive radar signals. The second plurality of receive radar signals can represent responses to a first plurality of independent transmitted radar signals from a field of view. The system can also include a virtual antenna formation module configured to combine the second plurality of receive radar signals to form a combined receive radar signal for the field of view. Further, a system can include an imaging module configured to provide a representation of one or more areas of interest in the field of view using the combined receive radar signal. The imaging module can also be configured to render the one or more attributes of the one or more areas of interest using the representation of the one or more areas of interest.

In various embodiments, a method can include receiving a second plurality of receive radar signals using a receive array including a second plurality of receiver antennas. The second plurality of receive radar signals can represent responses to a first plurality of independent transmitted radar signals from a field of view. A method can also include combining the second plurality of receive radar signals to form a combined receive radar signal for the field of view. Further, a representation of one or more areas of interest in the field of view can be provided using the combined receive radar signal. Additionally, one or more attributes of the one or more areas of interest can be rendered using the representation of the one or more areas of interest.

In certain embodiments, a radar imaging system includes a signal generator configured to generate a first plurality of independent waveforms. The radar imaging system can also include a signal conversion module configured to convert the first plurality of independent waveforms into a first plurality of independent transmitted radar signals. Additionally, the radar imaging system can include one or more first Monolithic Integrated Circuits ("MMICs"). The first MMICs can include (e.g., implement) a transmitter array comprising a first plurality of transmitter antennas configured to transmit the first plurality of independent transmitted radar signals toward a field of view. Further, the radar imaging system can include one or more second MMICs. The one or more second MMICs can include (e.g., implement) a receiver array comprising a second plurality of receiver antennas configured to receive a second plurality of receive radar signals representing responses to the first plurality of independent transmitted radar signals from the field of view. In some implementations, an MMIC may include one or more transmitter arrays and/or receiver arrays. The one or more second MMICs can also include a sampling module coupled to the receiver array configured to sample the second plurality of receive radar signals. The radar imaging system can also include a processing module coupled to the sampling module. The processing module can be configured to implement a virtual antenna formation module configured to combine the second plurality of receive radar signals to form a combined receive radar signal for the field of view. The processing module can also be configured to implement an imaging module configured to provide a representation of one or more areas of interest in the field of view using the combined receive radar signal. The imaging module can also be configured to render one or more attributes of the one or more areas of interest using the representation of the one or more areas of interest.

In various embodiments, a radar imaging system can be implemented by one or more integrated circuits. As an example a plurality of integrated circuits may implement a radar imaging system. The one or more integrated circuit(s) can comprise a receiver array including a second plurality of receiver antennas configured to receive a second plurality of receive radar signals. The second plurality of receive radar signals can represent responses to a first plurality of independent transmitted radar signals from a field of view. Additionally, the one or more integrated circuit(s) can comprise a sampling module coupled to the receive array and configured to sample the second plurality of receive radar signals. A radar imaging system can include a processing module coupled to the sampling module. The processing module can be configured to implement a virtual antenna formation module. A virtual antenna formation module can be configured to combine the second plurality of receive radar signals to form a combined receive radar signal for the field of view. Additionally, a processing module can be configured to implement an imaging module. A imaging module can be configured to provide a representation of one or more areas of interest in the field of view using the combined receive radar signal. Additionally, a imaging module can be configured to render one or more attributes of the one or more areas of interest using the representation of the one or more areas of interest.

Description

The disclosed technology addresses the various technical needs, including one or more technical needs in the art for improved object sensing. The present technology involves systems, methods, and computer-readable media for performing object sensing using radar. These systems include hardware, software, and/or firmware, examples of which are disclosed at length herein.

As discussed previously, object sensing plays a critical role in various industries, such as the automotive industry, the aeronautical industry, the railroad industry, and various maritime contexts. Being able to detect objects from a vehicle, for instance, could reduce accidents, provide actionable intelligence to drivers (human or automated), reduce property damage or the number of human lives lost in a year, and could save companies and insurance companies a lot of money. Unfortunately, existing systems do not meet these longstanding needs in an efficient or cost-effective way.

For example, lidar and computer vision techniques have been used to perform object sensing. However systems that use lidar and computer vision for object detection have many drawbacks. Specifically, the frequency ranges of electromagnetic energy used by lidar and computer vision object detection systems degrade performance of such systems in certain environments and operational scenarios. For example, lidar and computer vision object detection systems have difficulty sensing objects in fog and rain. Many may wonder what the use of an object sensing system is if it doesn't work when the line of sight to an object is blocked or occluded. Further, lidar and computer vision object detection systems are unable to identify scattering properties of objects in an environment. In turn, lidar and computer vision object detection systems are unable to determine characteristics of an object, e.g. a material composition of the object, based on the scattering properties of the object. Additionally, lidar and computer vision object detection systems are unable to identify an instantaneous velocity of a detected object, e.g. for purposes of controlling an automobile based on the velocity of the object. Further, lidar and computer vision object detection systems are unable to detect velocities of objects that are moving slowly. The present technology solves these and other deficiencies by performing object detection in a cost-effective and efficient way that is meaningful for a variety of industries, including various vehicular industries.

Further, existing object sensing techniques have many deficiencies in actual implementation in systems for performing object sensing. Specifically, lidar object sensing systems have many moving parts that make such systems prone to wear, overuse, and/or failure. Further, lidar object sensing systems utilize expensive components that make such systems difficult for widespread implementation. Additionally, computer vision object sensing systems are difficult to calibrate making such systems difficult to operate. As a result, existing systems, while lofty in their goals, are often too rudimentary or expensive to be of any practical use, particularly where scalability and/or mass production is desired. The present technology solves these and other deficiencies by performing object detection in a cost-effective and efficient way that is meaningful for a variety of industries, including various vehicular industries.

FIG. 1A illustrates an example system 100 of an object sensing system in accordance with some embodiments. The system 100 includes a radar imaging system 102, a vehicle 104, an object 106, and a field of view 108.

The radar imaging system 102 functions to use radar techniques to sense, detect, and/or image objects. Specifically, the radar imaging system 102 can implement radar techniques to estimate properties of the object 106 in the field of view 108. Further, the radar imaging system 102 can implement radar techniques to estimate properties of a channel, including scatterer(s), e.g. remote scatterer(s) in a channel. "Radar," as used herein, can utilize electromagnetic energy within the radio spectrum to estimate properties of a channel, e.g. for detecting objects and identifying characteristics of objects. A "channel," as used herein, can begin at a transmitter, extend through one or more radio wave scatterers, and end at a receiver. Measured properties of a channel can include applicable properties of the channel, e.g. for object detection and sensing. For example, measured properties of a channel can include propagation delay (the distance to a scatterer), Doppler frequency shift (the relative velocity of a scatterer), the attenuation of the signal within the channel, and/or the polarization transformation produced by a scatterer. In a channel, signals reflected by each scatterer can combine linearly. As a result, to take meaningful measurements, the radar imaging system 102 can be configured to probe the fewest possible scatterers at any given time, while still measuring properties of the channel. In turn, this implies a need for the radar imaging system 102 to have a high resolution, e.g. an improved resolution over traditional radar systems.

A large antenna aperture can be used to increase resolution in a radar system. Because a large antenna aperture produces a narrow beam pattern, it may be desirable for a radar system to have a mechanism for moving the beam pattern to examine a useful field of view. For example, a radar system can include one or more electrically-scanned antennas. More specifically, a radar system can include a phased array of antennas. In a phased array of antennas, a series of transmit antennas can be fed replicas of the same transmit signal shifted by a specific phase shift, e.g. a constant phase shift. When transmitted, these replicas sum constructively produce a beam pattern that propagates in a direction of interest. By changing the phase shift between the antennas, the direction of propagation can be controlled. This is known as beamforming.

Beamforming can also be performed when receiving a signal. If the signals from each receive antenna are independently recorded (with respect to a single master reference oscillator, i.e. "coherently") then these recorded signals can be summed together with a fixed phase shift to recover the signal that impinged upon the array from a particular direction of arrival, if such a signal exists. Signal processing can then be run on this signal to estimate the properties of the channel. This is known as single-input multiple-output (SIMO) because a single signal (or phase-shifted replicas of a single signal) are transmitted, and multiple receive signals are then recorded and processed.

Another approach to electronic antenna scanning is known as multiple-input multiple-output (MIMO). This approach has been enabled by improvements in signal processing and the declining cost of computing power. In contrast with the previously-described SIMO system, a MIMO system transmits multiple truly independent signals (not just phase-shifted replicas of the same signal) from different antennas to estimate the channel. To make these transmitted signals independent they may be separated in time, space, code, or frequency. As before, multiple receive signals are recorded.

Transmitting independent probing signals allows a whole new degree of freedom to be exploited in trying to estimate the channel parameters. If the transmitted signals are independent, then it is possible to tell at the time of reception which signal came from which transmitting antenna. This allows a whole new degree of freedom to be exploited when trying to estimate the channel parameters and construct a final output image. To see how this works, consider the following scenario. If a radar were using a single CW tone, all of the scatterers in the scene would interfere with each other. If sampled with a quadrature mixer, they would produce a single in-phase/quadrature (I/Q) output. Here, the "resolution" is the entire scene. If the radar then changes to a second frequency, the same scatterers will constructively and destructively interfere in another way, producing a different I/Q output. Taking measurements at multiple different frequencies will produce several different I/Q measurements.

Similarly, if either or both the transmit antenna and the receive antenna are physically moved or manipulated, the differential ranges from those antennas to all the scatterers change. They now interfere in a different constructive and destructive way, producing a different I/Q value.

By adding additional degrees of freedom, different complex I/Q measurements of the scene can be generated which can subsequently be used to form the final image. Each measurement adds new information that increases the resolution in ("sharpens") the final image.

This offers several advantages, such as improved resolution in radar systems. Specifically, the radar imaging system 102 can utilize sparse antenna arrays, which when combined with MIMO signal processing, as will be discussed in greater detail later, result in system performance that corresponds to a fully-filled virtual array. Specifically, the radar imaging system 102 can contain $N_{Tx}$ transmitters and $N_{Rx}$ receivers and have a resolution of $N_{Tx} N_{Rx}$ without MIMO processing. However, the radar imaging system 102 can use MIMO processing to achieve a resolution comparable to a traditional array system with $N_{Tx} \times N_{Rx}$ array elements. As mentioned before, each different transmitter-receiver combination generates another different I/Q output. The virtual array can contain an element for each of these transmit-receive combinations. Using MIMO reduces the overall cost and complexities of radar systems as fewer array elements are needed to achieve higher resolutions.

The vehicle 104 is shown as a car, but may include any item used to transport items and/or people, such as a car, a truck, a van, a train (passenger/freight), airplane, extraterrestrial craft, maritime craft, etc. The vehicle 104 may comprise a semi-autonomous or fully autonomous vehicle that is capable of sensing its environment and moving safely with little and/or no human input. Examples of autonomous vehicles include autonomous cars, trucks, vans, airplanes (e.g., civilian and/or military drones), autonomous space vehicles, autonomous maritime craft, etc. In some embodiments, as noted here, the radar imaging system 102 may be coupled to (e.g., mounted on) the vehicle 104 and may include a vehicular radar system configured to image targets for the vehicle 104.

The object 106 may comprise any tangible item. The object 106 may include inanimate items, human beings, animals, other vehicles, obstacles, portions of roadways/waterways (lanes, signs, curves, slopes, etc.), navigational objects, etc. The field of view 108 may comprise an observable area that is visible to the components of the radar imaging system 102. As noted herein, the field of view 108 may be broken into areas of interest that the radar imaging system 102 can represent as voxels and/or attributes.

Figure 1B:
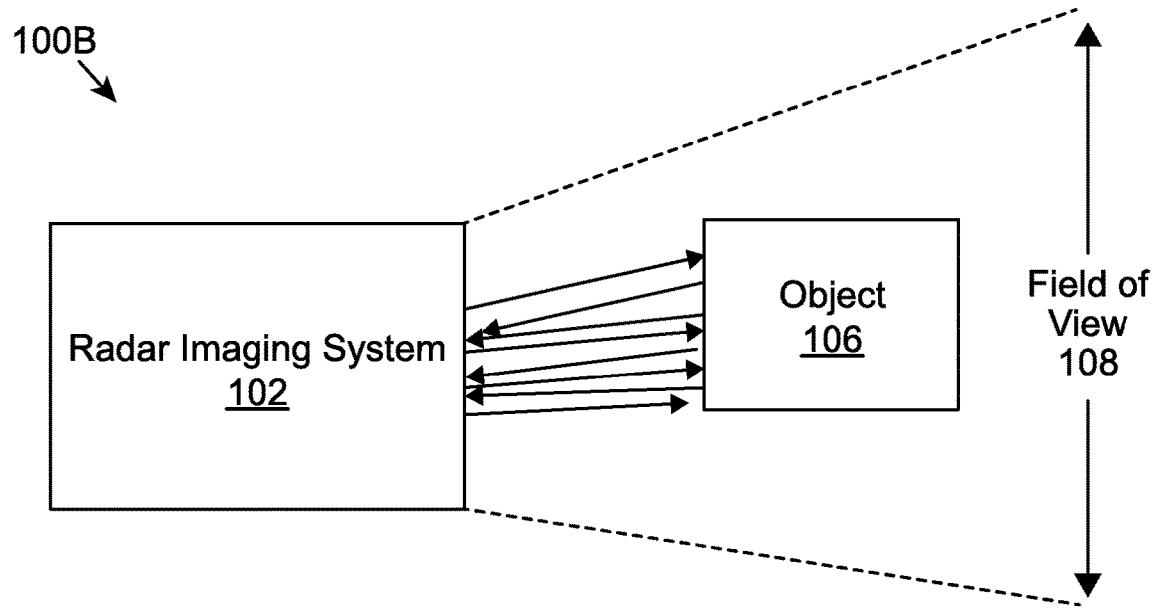
FIG. 1B illustrates an example system of an object sensing system in accordance with some embodiments.
Figure 1C:
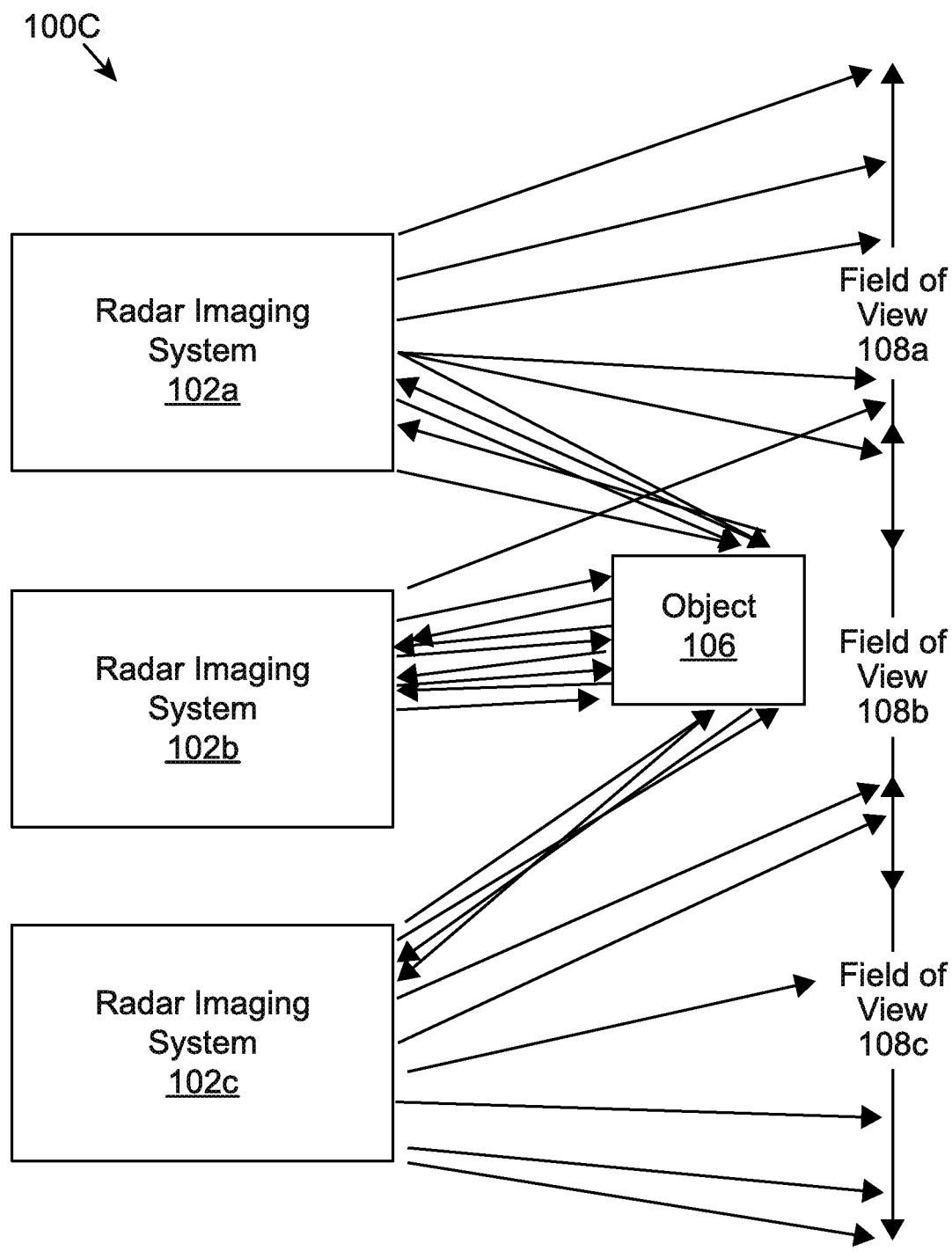
FIG. 1C illustrates an example system of an object sensing system in accordance with some embodiments.

FIGS. 1B and 1C show additional examples of the object sensing system 100 in accordance with some embodiments. In FIG. 1B, the radar imaging system 102 is not mounted on a vehicle. In FIG. 1C, a plurality of radar imaging systems 102(a)-102(c) (shown in FIG. 1C as three units, but potentially an arbitrary number of units) are configured to image the object 106. Each of the radar imaging systems 102(a)-102(c) have a respective field of view 108(a)-108(c).

Figure 2A:
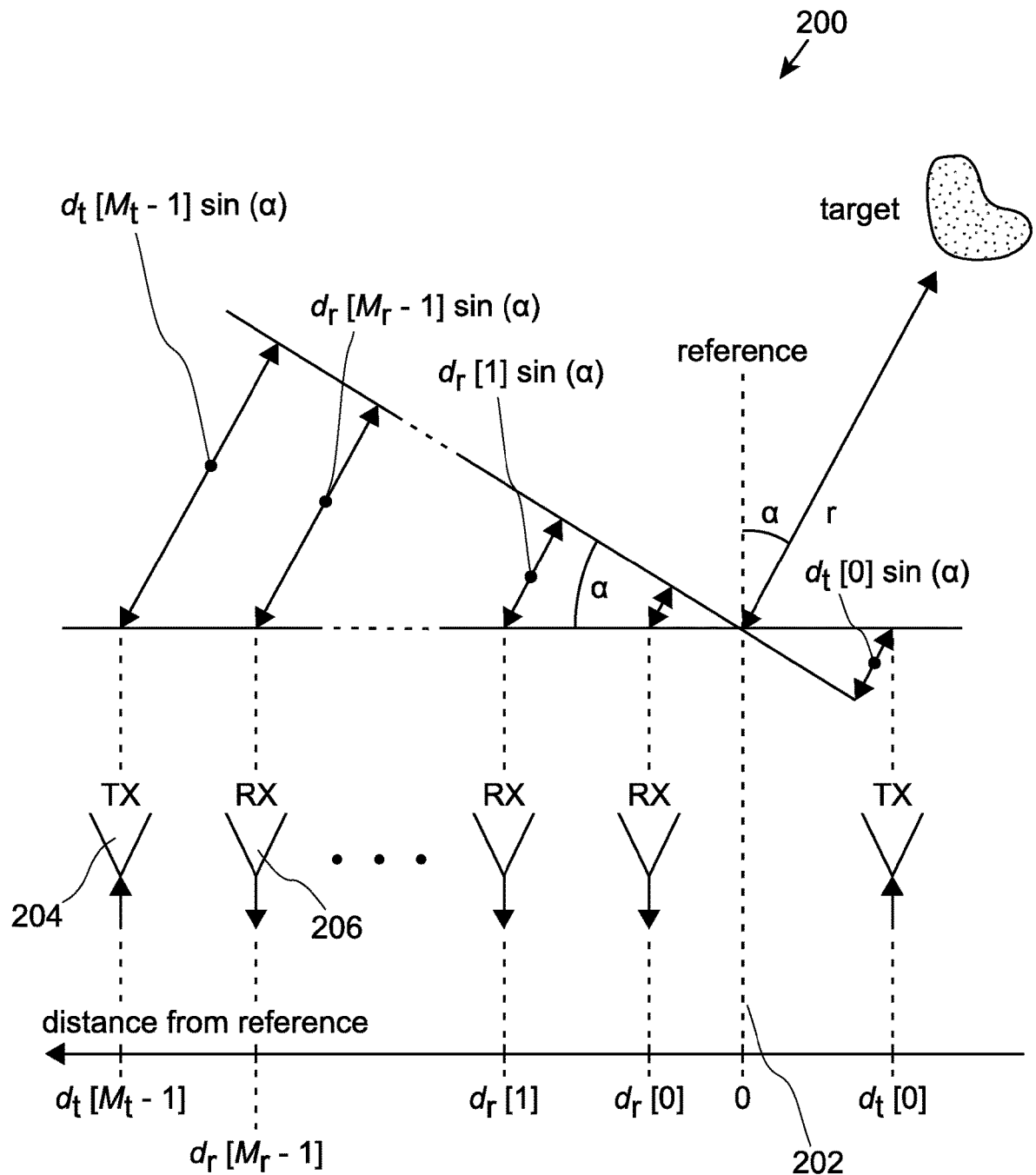
FIG. 2A shows a transmit and receive array illustrating how MIMO can increase resolution in a radar imaging system.

FIG. 2A shows a transmit and receive array 200 illustrating how the radar imaging system 102 can produce images, often with excellent resolution. In the array 200 shown in FIG. 2A, the round-trip delay from a transmitter to a receiver includes three parts. First, there is the round-trip delay from an array reference point 202 to the target at distance r and back. Second, there is the delay due to the distance from a transmitter to the reference point 202. This distance is represented for a transmitter 204 by the line segment labeled "$d_t[0]\sin(\alpha)$" in FIG. 2. Finally, there is the distance from the reference point to a receiver. This is shown for a receiver 206 by the line segment labeled "$d_r[M_r-1]\sin(\alpha)$" in FIG. 2.

If an array only contains one transmitter, each receiver's signal is delayed only by that receiver's distance from the array reference point. However, as shown in the array 200, if more than one transmitter is used then these receivers can be "reused" because their signals are now also delayed by the transmitter's distance from the array reference point. This assumes that a corresponding transmitter of the more than one transmitters used to generate the received signals can be identified. Accordingly multiplexing of transmissions: separating them in time, frequency, or using code-division, can be used to identify a corresponding transmitter used to generate received signals, effectively allowing for "reuse" of receiver antennas to receive a plurality of received signals. This "reuse" of receiver antennas can be implemented in a radar system, e.g. the radar imaging system 102, to achieve a virtual array having a resolution equivalent to an array having $N_{Tx} \times N_{Rx}$ array elements, transmitters and receivers.

The following illustrates some advantage(s) of a MIMO system. Specifically, with traditional beamforming, the resolution of the system is given by the physical antenna aperture. A MIMO radar allows the construction of a virtual aperture which can be much larger than the physical aperture of the system. This virtual aperture can be the aperture created by the $N_{Tx} \times N_{Rx}$ measurements taken from slightly different spatial positions. In turn, this causes the scatterers to interfere in different constructive and destructive ways, producing $N_{Tx} \times N_{Rx}$ different I/Q values.

Currently, radar use in automobiles has been limited to small aperture systems that are used for forward collision avoidance, adaptive cruise control, and blind spot detection. These typically offer a limited angular field of view, limited scanning if any, limited resolution, and a limited number of targets that can be detected. For example, existing vehicular radar solutions may only be able to track parameters (e.g., position, velocity, etc.) of a fixed number of targets but do not provide information about attributes within a field of view other than those fixed targets.

In contrast, the technology described herein can employ radar designed to generate a full 3D image with large numbers (thousands, millions, billions, etc.) of pixels. The technology described herein provides images of a field of view, and as a result, can be integrated with sensors used for vehicular navigation (lidar, cameras, etc.). The embodiments herein may be configured to provide images of targets of relatively low intensity, images of targets characterized by relatively slow motion, and images of scenes with a lot of noise/clutter.

Table 1 shows some differences between existing automotive radar solutions and the radar imaging system embodiments described herein:

TABLE 1

| | Existing Automotive Radar Systems | Radar Imaging Systems |
|---|---|---|
| Targets | Detects the position of a finite number of targets (e.g. 64). Offers little or no information about anything else in the scene. | Detects the reflectivity of individual voxels in space. Unit can interrogate free space and ask "what's at position (x, y)?" |
| Tracking | May track the position and velocity of those targets. | Tracking is performed by higher-level processes, higher up the chain than the imaging step. |
| Resolution | Low, e.g. 1 degree in azimuth in no resolution at all in elevation | High in both azimuth and elevation |
| Dimensionality | No or very limited vertical scanning, a 1D system that scans side-to-side only | Full 2D scanning - horizontal and vertical |

Figure 3:
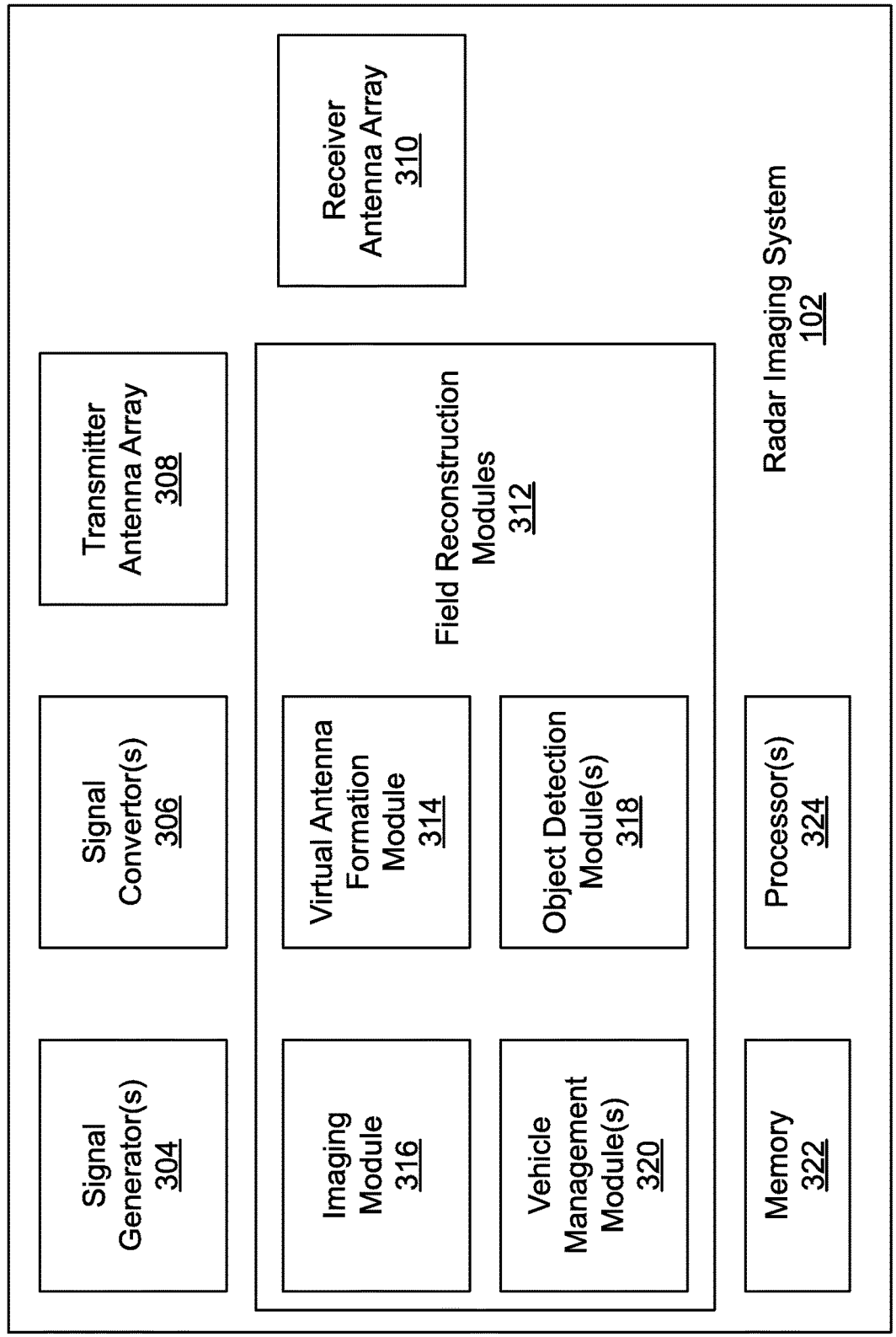
FIG. 3 shows the radar imaging system.

FIG. 3 shows the radar imaging system 102 in greater detail. The radar imaging system 102 includes signal generator(s) 304, signal converter(s) 306, a transmitter antenna array 308, a receiver antenna array 310, field reconstruction modules 312 (including for instance a virtual antenna formation module 314, an imaging module 316, object detection module(s) 318, and vehicle management module(s) 320), memory 322, and processor(s) 324.

The signal generator(s) 304 function to generate waveforms for use in transmitting radio waves. The signal generator(s) 304 can function according to an applicable generator for generating waveforms used in transmitting radio waves. Further, the signal generator(s) 304 can be incorporated with or implemented as part of an applicable electrical device for transmitting and/or receiving radio waves. For example, the signal generator(s) can be implemented with a transmission line for use in transmitting radio waves. Additionally, the signal generator(s) 304 can be incorporated as part of a feed source ultimately used to generate radio waves for transmission.

In generating waveforms used in transmitting radar signals, the signal generator(s) 304 can generate a plurality of independent waveforms that are subsequently used as part of transmitting radio waves. The plurality of independent waveforms generated by the signal generator(s) 304 may be independent due to time shifts, phase shifts, code divisions, and/or frequency shifts.

Figure 2B:
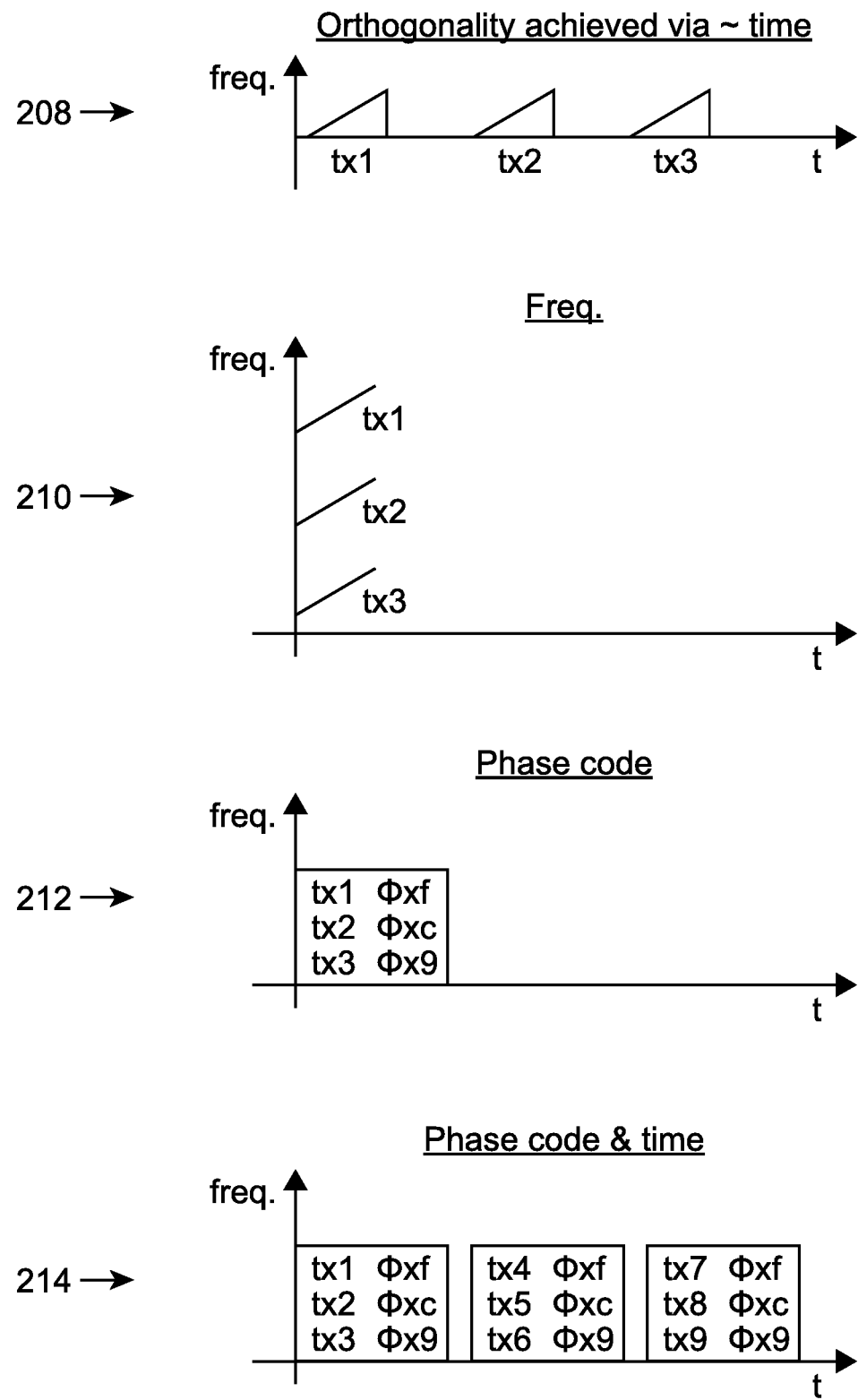
FIG. 2B shows example time divided signals 208, frequency divided signals 210, phase code separated signals 212, and combination phase code/time divided signals 214.

As noted herein, the use of orthogonal/independent waveforms may allow the radar imaging system 102 to identify the signals that were sent from specific elements of the transmitter antenna array 308. The signal generator(s) 304 may create signals separated in time, frequency, signals characterized by orthogonal digital modulation (e.g., Phase Shift Key (PSK) modulation), etc. The signal generator(s) 304 may use combinations of these methods as well. FIG. 2B shows example time divided signals 208, frequency divided signals 210, phase code separated signals 212, and combination phase code/time divided signals 214. In some embodiments, the signal generator(s) 304 generate an integral number (e.g., three) signals at a time. FIG. 2B shows various scenarios in which three signals are generated at a time. It is noted that in systems with more than the integral number (e.g., here three) transmitters, the integral number of signals could be combined with time to achieve orthogonality of more than three transmitted waveforms.

The signal generator(s) 304 can generate a plurality of independent waveforms by performing one or more time shifts on one or more master signals to generate a plurality of independent waveforms. Additionally, the signal generator(s) 304 can generate a plurality of independent waveforms by performing one or more phase shifts on one or more master signals to generate a plurality of independent waveforms. Further, the signal generator(s) 304 can generate a plurality of independent waveforms by performing one or more code divisions on one or more master signals to generate a plurality of independent waveforms. The signal generator(s) 304 can also generate a plurality of independent waveforms by performing one or more frequency shifts on one or more master signals. It is noted the signal generator(s) 304 can perform some combination of time shifts, phase shifts, code divisions, and/or frequency shifts.

FIG. 4 shows example waveforms that can be generated by the signal generator(s) 304. Specifically, the signal generator(s) 304 can generate a sawtooth waveform 400, as shown in FIG. 4. Alternatively, the signal generator(s) 304 can generate a triangle waveform 402, as shown in FIG. 4. Additionally, the signal generator(s) 304 can generate a stepped waveform 404, as shown in FIG. 4.

Returning to FIG. 3, the signal converter(s) 306 function to process the plurality of waveforms generated by the signal generator(s) 304 for transmission as radio waves. Specifically, the signal converter(s) 306 can convert the plurality of waveforms generated by the signal generator(s) 304 into a plurality of transmitted radar signals. Transmitted radar signals, as used herein, can refer to both a signal before it is transmitted as an actual radar signal, e.g. after it is processed by the signal converter(s) 306, and a signal that is transmitted as an actual radar signal. The signal converter(s) 306 can function according to an applicable converter for processing waveforms for transmission as radio waves. Further, the signal converter(s) 306 can be incorporated with or implemented as part of an applicable electrical device for transmitting and/or receiving radio waves. For example, the signal converter(s) 306 can be implemented with a transmission line for use in transmitting radio waves. Additionally, the signal converter(s) 306 can be incorporated as part of a feed source ultimately used to generate radio waves for transmission.

In various embodiments, the signal converter(s) 306 can perform signal processing techniques that lead to rejection of mutual interference between different units, e.g. vehicles, using the radar imaging system 102. For example, the signal converter(s) can, at least in part, function to create phase-coded waveforms. This is advantageous over current MIMO radar systems that typically use linear frequency modulation (LFM).

In processing the plurality of waveforms generated by the signal generator(s) 304, the signal converter(s) 306 can apply an applicable modulation scheme to generate a plurality of transmitted radar signals. Specifically, the signal converter(s) 306 can include one or more mixers configured to mix the waveforms received from the signal generator(s) 304 to generate one or more transmitted radar signals. More specifically, the signal converter(s) 306 can include one or more mixers configured to apply an applicable modulation scheme to mix the waveforms received from the signal generator(s) 304 to generate one or more transmitted radar signals.

The signal converter(s) 306 can apply a frequency modulation scheme to generate a plurality of transmitted radar signals from the plurality of waveforms generated by the signal generator(s) 304. Specifically, the signal converter(s) 306 can apply a Frequency-Modulated Continuous-Wave (FMCW) modulation scheme in order to generate a plurality of transmitted radar signals from the plurality of waveforms generated by the signal generator(s) 304. In a FMCW modulation scheme, a carrier sine wave is modulated with a changing frequency. The frequency changes e.g. according to a sawtooth waveform modulation scheme, a triangle waveform modulation scheme, or a stepped waveform modulation scheme, as shown in FIG. 4. This modulated carrier wave can then be transmitted. The wave can travel to a target, where at least a portion of the carrier wave can be reflected back. The reflect back energy from the carrier wave can be received, and, as will be discussed in greater detail later, can be recombined in a mixer with a local oscillator (LO) signal. This LO signal is the portion of the modulated carrier wave being currently transmitted at that moment. Because of the modulation of the carrier wave and the time delay to the remote target, recombining these signals produces a beat frequency. This beat frequency can be proportional to the distance to the target. By measuring the beat frequency, the distance to the target can be determined. Further, since it is possible to measure frequency very precisely, this allows the distance to the target to be estimated with a high accuracy.

The signal converter(s) 306 can apply a digital modulation (e.g., Phase Shift Key (PSK) modulation) scheme to generate a plurality of transmitted radar signals from the plurality of waveforms generated by the signal generator(s) 304. For example, PCM allows many different devices to share the same channel. This could be an advantage on a crowded roadway where lots of different radars need to operate without interfering with each other. Further, the signal converter(s) 306 can apply an Orthogonal Frequency-Division Multiplexing (OFDM) modulation scheme in order to generate a plurality of transmitted radar signals from the plurality of waveforms generated by the signal generator(s) 304. Both PCM and OFDM can be used to generate multiple waveforms that are orthogonal. Thus even if multiple waveforms are received simultaneously, they can be separated. In various embodiments, this would allow multiple transmitters of the present technology to transmit at the same time, allowing for faster data acquisition.

The transmitter antenna array 308 functions to transmit the plurality of independent transmitted radar signals generated by the signal converter(s) 306 towards a field of view. In particular, the transmitter antenna array 308 can transmit the plurality of independent transmitted radar signals towards a field of view for purposes of sensing objects in the field of view and characterizing the objects in the field of view. The transmitter antenna array 308 can function as an applicable array of antennas for transmitting a plurality of radar signals towards a field of view, such as the antenna arrays described herein. For example, the transmitter antenna array 308 can be formed by a plurality of antennas. In some implementations, one or more of the antennas perform scanning, e.g. are electrically-scanned antennas. In various implementations, however, not all antennas need to be scanning. For instance, scanning operations may be performed (as noted herein) after combination and/or other mathematical operations are performed. Further, the transmitter antenna array 308 can be controlled according to an applicable control scheme for transmitting a plurality of radar signals towards a field of view, such as the antenna control schemes described herein. For example, the transmitter antenna array 308 can be controlled according to a MIMO control scheme to transmit a plurality of transmitted radar signals that are truly independent radar signals, e.g. not just phase shifted replicas from the same signal.

In transmitting independent radar signals, the transmitter antenna array 308 can form, at least part of, a sparse antenna array. An "antenna array," as used herein, may refer to a plurality of real antenna elements spatially distributed over either one, two, or three dimensions, and/or in an orientation dimensions perpendicular to a radar-range dimension. The elements of an antenna array may, e.g., transmit or receive a signal simultaneously in real time, and the signals passing through them can be individually subjected to controlled shifts of the phases of those signals. The elements in an antenna array may be spaced at a distance (e.g., for a dense equispaced array, $\lambda/2$) from one another. A "sparse antenna array" or a "sparse array," as used herein, may include an antenna array in which one or more of the elements of a dense equispaced array are not present. An "antenna array" may form a "virtual aperture," which as used herein, may include an ordered combination of receive signals. As noted herein, a virtual aperture may be configured such that its size is larger than the size of its individual antenna elements. For instance, as the transmitter antenna array 308 transmits independent signals to form a sparse antenna array, an effective aperture size of the sparse antenna array, including the transmitter antenna array 308, is increased beyond what the actual aperture size of the antenna array actually is. Specifically, the sparse antenna array formed by the transmitter antenna array 308 can have a greater effective aperture size than an actual physical aperture of the sparse antenna array. An actual physical aperture of the sparse antenna array, as used herein, can include an aperture size of the sparse antenna array if the antenna array transmitted signals that are not truly independent, e.g. not using MIMO.

Accordingly, the increased effective aperture size of the sparse antenna array can be used, at least in part, to create a virtual aperture as the aperture size of the radar imaging system 102 is different/larger than the actual physical aperture of the radar imaging system 102. In turn and as discussed previously, this can enable the radar imaging system 102 to achieve higher/increased spatial resolution. Further, this can reduce the cost and complexity of the radar imaging system 102, both of which are deficiencies of current radar systems, e.g. radar imaging systems.

The receiver antenna array 310 functions to receive responses to the plurality of independent transmitted radar signals transmitted by the transmitter antenna array 308. Specifically, the receiver antenna array 310 can receive radar signals representing responses from the field of view to the plurality of independent transmitted radar signals transmitted by the transmitter antenna array 308 into the field of view. More specifically, the receiver antenna array 310 can receive responses to the plurality of independent transmitted radar signals from the field of view for purposes of sensing objects in the field of view and characterizing the objects in the field of view. Responses to the first plurality of independent transmitted radar signals from the field of view can include one or a combination of scattered, reflected, or refracted energy, e.g. radar waves, from the independent transmitted radar signals that are transmitted into the field of view by the transmitter antenna array 308. For example, the responses to the plurality of independent transmitted radar signals transmitted into the field of view can include one or more diffuse reflections of the transmitted radar signals from the field of view. In another example, the responses to the plurality of independent transmitted radar signals can include responses to one or more scatterers in the field of view The receiver antenna array 310 can function as an applicable array of antennas for receiving a plurality of radar signals from a field of view, such as the antenna arrays described herein. For example, the receiver antenna array 310 can be formed by a plurality of scanning antennas, e.g. electrically-scanned antennas. In another example, one or more receivers of the receiver antenna array 310 can be integrated into a MIMIC. Further, the receiver antenna array 310 can be controlled according to an applicable control scheme for receiving a plurality of radar signals from a field of view, such as the antenna control schemes described herein. For example, the transmitter antenna array 308 can be controlled according to a MIMO control scheme to form a virtual aperture for receiving a plurality of transmitted radar signals. Additionally, the receiver antenna array 310 can form part of a sparse antenna array, e.g. with the transmitter antenna array 308.

A number of antennas in the receiver antenna array 310 and a number of antennas in the transmitter antenna array 308 can be any known or convenient number. In various embodiments, a number of antennas in the receiver antenna array 310 is greater than a number of antennas in the transmitter antenna array 308. For example, the number of the receiver antennas can be two, three, etc. times the number of transmitter antennas. This is further achievable in the radar imaging system system 102, as a number of transmit antennas in a sparse antenna array can be reduced when the transmit antennas transmit independent radar signals. In some implementations, the number of antennas in the receiver antenna array 310 is less than a number of the antennas in the transmitter antenna array 308. Due to cost or other advantages, it may be desirable to have more antenna in the transmitter antenna array 308 than the number of antennas in the receiver antenna array 310.

Antennas in the receiver antenna array 310 can have different polarizations. Specifically, a first group of antennas in the receiver antenna array 310 can have a first polarization and a second group of antennas in the receiver antenna array 310 can have a second polarization different from the first polarization. For example, a first group of antennas in the receiver antenna array 310 can be perpendicularly polarized with respect to a polarization of a second group of antennas in the receiver antenna array 310.

Because both the transmitter antenna array 308 and the receiver antenna array 310 can form part of a sparse array, the transmit and receive antennas may be spread across wide distances of up to several meters. Distributing high-frequency signals across such distances is a challenge. First, signals transmitted over longer wires/transmission lines can be corrupted by interference received through undesired antenna action. Second, longer wires/transmission lines can radiate interference that harms the performance of other parts of the system or violates regulatory emissions standards. Another issue is that it is usually expensive to design a circuit to transfer high frequency signals across long distances, e.g. precision connectors and high-quality wires are needed. Therefore, it is highly desirable to limit the number of high frequency signals that are transferred within the circuit(s) of the radar imaging system 102. Accordingly, in various embodiments, the frequency of any signals that must span wide distances within the radar imaging system 102 can be reduced. Further, in various embodiments, signals that span wide distances within the radar imaging system 102 can be converted to digital signals. Specifically, digital signals can be transferred within the radar imaging system with much higher reliability using cheaper connectors and signal paths in order to alleviate the previously described issues of long signal transmission distances within the radar imaging system 102.

The field reconstruction modules 312 include a plurality of modules configured to image a field of view and/or perform object detection and characterization in one or more fields of view. Specifically, the field reconstruction modules 312 can be used to image a field of view and/or perform object detection and characterization in the field of view based on the plurality of independent transmitted radar signals transmitted by the transmitter antenna array 308. Further, the field reconstruction modules 312 can be used to perform object detection and characterization in the field of view based on responses to the plurality of independent transmitted radar signals that are received from the field of view by the receiver antenna array 310.

The virtual antenna formation module 314 functions to process responses (e.g., those that are received by the receiver antenna array 310) to the independent transmitted radar signals. The virtual antenna formation module 314 may operate to recover signal attributes of independent transmitted radar signals relevant to imaging the object 106 within the field of view 108.

As an example, the virtual antenna formation module 314 may operate to recover a plurality of independent waveforms and/or any information gained from interaction of a plurality of independent waveforms with a field of view from responses to radar signals received at the receiver antenna array 310. As noted herein, a plurality of independent waveforms (e.g., those generated at the signal generator(s) 304) are often independent (e.g., orthogonal), and as a result, are capable of being recovered from responses to them that are received at, e.g., the receiver antenna array 310. The virtual antenna formation module 314 can function to determine time delays, phase differences, differences, in modulation properties, etc. to identify information from interaction of the plurality of independent waveforms with objects in the field of view. In various implementations, the virtual antenna formation module 314 creates and/or modifies a datastore (e.g., a database implementing a matrix) that contains properties of signals transmitted from the transmitter antenna array 308 and/or properties responses received at the receiver antenna array 310.

Figure 2C:
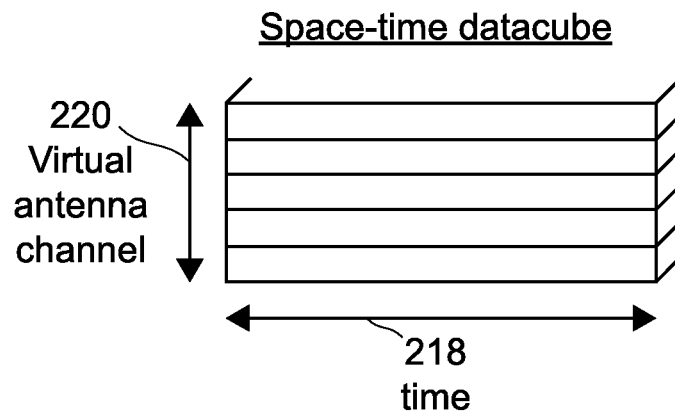
FIG. 2C shows a conceptual representation of a datastore created and/or modified by a virtual antenna formation module.

A conceptual representation of a datastore created and/or modified by the virtual antenna formation module 314 is shown in FIG. 2C. As shown in FIG. 2C, a space-time datacube 216 may include a time dimension 218 and a virtual antenna channel dimension 220. The virtual antenna formation module 314 may transform responses to radar signals received at the receiver antenna array 310 into entries on the space-time datacube 216. The method of doing so may depend on how transmitted signals from the transmitter antenna array are orthogonal to one another. As an example, were transmitted signals orthogonal in time, the virtual antenna formation module 314 may insert each received signal in a row into the space-time datacube 216. As another example, were transmitted signals orthogonal with respect to frequency, the virtual antenna formation module 314 may frequency-shift each received signal to a converted frequency (e.g., a constant baseband frequency) and insert each signal in a row into the space-time datacube 216. For transmitted signals orthogonal by digital code, the virtual antenna formation module 314 may correlate each received signal with its respective transmit code and insert the resulting signal in a row into the space-time datacube 216. For transmitted signals orthogonal by both digital code and time, the virtual antenna formation module 314 may correlate each received signal with its respective transmit code and insert the resulting signal in a row into the space-time datacube 216; this may be repeated for all time steps.

Recovery of independent waveforms and/or any information gained from their interaction with a field of view may include one or more operations to resolve independence (e.g., orthogonality) of independent waveforms. Recovery of independent waveforms and/or any information gained from their interaction with a field of view may depend, wholly or partially, on properties of the independent waveforms. As an example, in some embodiments, where a plurality of independent waveforms are time divided, the virtual antenna formation module 314 may function to resolve time differences in waveforms at the receiver antenna array 310. The time differences may correspond to time division properties of the plurality of independent waveforms. As another example, where a plurality of independent waveforms are characterized by different digital codes (e.g., different phase codes), the virtual antenna formation module 314 may function to correlate modulation properties of signals received at the receiver antenna array 310 with modulation properties of independent waveforms that were transmitted.

As yet another example, where a plurality of independent waveforms are frequency and/or phase divided, the virtual antenna formation module 314 may function to resolve frequency and/or phase differences in waveforms at the receiver antenna array 310 and/or combine waveforms at the receiver antenna array 310. For instance, the virtual antenna formation module 314 can function to combine the plurality of receive radar signals received by the receiver antenna array 310 to form a combined receive radar signal for the field of view. Specifically, the virtual antenna formation module 314 can combine the plurality of receiver radar signals representing responses to the independent transmitted radar signals that are transmitted into the field of view by the transmitter antenna array 308. In processing the plurality of independent waveforms and/or any information gained from their interaction with a field of view, the virtual antenna formation module 314 can effectively form a virtual array aperture with the combined receive radar signal. Specifically, the virtual antenna formation module 314 can combine the receive radar signals received at a virtual field of antenna elements. In some embodiments, a processing of receive radar signals performed by the virtual antenna formation module 314 can correspond to a convolution of positions of antennas in the transmitter antenna array and antennas in the receiver antenna array 310. Such a convolution may be used in some applications to derive positions of virtual antenna array elements and/or other attributes of a virtual antenna array. As described previously with respect to MIMO processing, this can create an effective aperture that is greater in size than an actual physical aperture size formed by the transmitter antenna array 308 and the receiver antenna array 310.

The virtual antenna formation module 314 can utilize an applicable signal combination method for combining the receive radar signals received by the receiver antenna array 310 to generate the combined receive radar signal. Specifically, the virtual antenna formation module 314 can perform a summation of the receive radar signals received by the receiver antenna array 310 to form the combined receive radar signal. Further, the virtual antenna formation module 314 can perform a linear operation on the receive radar signals received by the receiver antenna array 310 to form the combined receive radar signal. Alternatively, the virtual antenna formation module 314 can perform a mathematical integration of the receive radar signals received by the receiver antenna array 310 to form the combined receive radar signal. Additionally, the virtual antenna formation module 314 can multiply the receive radar signals received by the receiver antenna array 310 to form the combined receive radar signal.

Further, the virtual antenna formation module 314 can sample the receive radar signals received by the receiver antenna array 310 to generate the combined receive radar signal. In sampling the receive radar signals, the virtual antenna formation module 314, can implement, at least in part, a sampling module. The virtual antenna formation module 314 can then buffer the sampled receive radar signals and the combined receive radar signal for the field of view. The sampled receive radar signals, e.g. for each transmit to receive signal path, can then be utilized to produce a corrected signal. Specifically, the sampled receive radar signals can be used, as will be discussed in greater detail later, in an image formation calibration process to account for phase errors and give an improved accuracy, e.g. on the order of 1 degree, 5 degrees, 10 degrees, 20 degrees, etc. phase errors. Further, by buffering sampled signals, computational resources can be shared or otherwise recycled and operations can be interleaved in time to allow the reuse of fewer chips or channels. This is advantageous as a key challenge to system design is sampling potentially hundreds of receive antennas at a relatively high bandwidth with a system that is relatively inexpensive.

As discussed previously, the virtual antenna formation module 314 can buffer the combined receive radar signal. Further, the radar imaging system 102 can include one or more multiplexers coupled to the virtual antenna formation module 314. Multiplexers coupled to the virtual antenna formation module 314 can be used provide a portion of the buffered combined receive radar signal, e.g. for purposes of image processing object detection and characterization. This can further reduce computational resources used in sending and characterizing objects in the field of view.

The imaging module 316 functions to generate a representation of the field of view. Specifically, the imaging module 316, as will be discussed in greater detail later, can generate a representation of one or more areas of interest in the field of view to render one or more attributes of the one or more areas of interest, e.g. using the representation of the one or more areas of interest. Attributes of one or more areas of interest can include actual features of an area of interest in a field of view. Specifically, attributes of an area of interest in a field of view can include geometric/position and properties of an object in an area of interest in the field of view. For example, attributes of one or more areas of interest can include a speed of an object in the field of view. In another example and as will be discussed in greater detail later, attributes of one or more areas of interest can include material properties of an object within a field of view. Further, attributes of an area of interest can indicate that an object is not in the field of view.

The imaging module 316 can use the combined receive radar signal created by the virtual antenna formation module 314 to generate a representation of the one or more areas of interest in the field of view, e.g. to render one or more attributes of the areas of interest in the field of view. Specifically, the imaging module 316 can apply applicable signal processing techniques to the combined receive radar signal to create the representation of the one or more areas of interest in the field of view. For example, the imaging module 316 can use the MIMO signal processing techniques, as described herein to generate a representation of the one or more areas of interest in the field of view. Further, the imaging module 316 can use the transmitted plurality of independent transmitted radar signals towards a field of view to generate a representation of one or more areas of interest in the field of view. For example and as discussed previously, the imaging module 316 can determine, e.g. at the time of reception, which response came from which transmitting antenna that transmitted a signal. Based on this association, the imaging module 316 can generate a representation of one or more areas of interest based on a received response and characteristics of the transmitting antenna, e.g. a position of the transmitting antenna, which transmitted a signal to cause the received response.

In generating a representation of the one or more areas of interest in the field of view, the imaging module 316 can estimate one or more scattering properties of the field of view using the responses to the first plurality of independent transmitted radar signals. Specifically, the imaging module 316 can estimate one or more scattering properties of the field of view to provide the representation of the one or more areas of interest. Specifically, depending on the nature of the scattering objects, the polarization of the reflected radiation may be different than what was transmitted. For example if horizontally-polarized radiation was transmitted, some portion of the received radiation may be polarized horizontally and some portion may be polarized vertically. The effect that an individual scatterer has on the polarization of an incident wave is strongly dependent on the material of the scatterer. Therefore observing this polarization shift allows the radar to infer the material properties of the scatterer downrange.

In particular, the representation of the areas of interest generated by the imaging module 316 can comprise a sum of responses to one or more scatterers in the field of view. Further, the representation of the areas of interest generated by the imaging module 316 can comprise a sum of reactions to one or more diffuse scatters in the field of view. Additionally, the representation of areas of interest generated by the imaging module 316 can comprise a first number of samples of a sum of responses to the first plurality of independent transmitted radar signals.

Further, the imaging module 316 can be configured to sample the representation of the one or more areas of interest. In sampling the representation of the one or more areas of interest, the imaging module can function to implement, at least in part a sampling module. Specifically, the imaging module 316 can be configured to create a buffered representation of the one or more areas of interest using the sampled representations of the areas of interest. Subsequently, the imaging module 316 can generate one or more image frames of the area of interest using the buffered representation of the one or more areas of interest. This is advantageous, as discussed previously, because it can reduce an amount of computational resources used in processing to create a representation of the one or more areas of interest.

In various embodiments, one frame processed by the imaging module 316 comprises the values recorded for every transmit-receive antenna combination over one or more sampling periods. The purpose of subsequent signal processing performed by the imaging module 316 is to interpret these signals to produce an image that estimates the scattering properties of the channel. As described before, a signal leaves the transmit antenna, propagates through space, and comes into contact with one or more scatterers. Each scatterer can reflect back a portion of the incident wave. These reflections can be received by all receive antennas. In the present, the channel can be assumed from transmitter to receiver as linear. Specifically this means that the actions of each scatterer obey the principle of superposition. This principle states that the net response of multiple scatterers is the sum of the response of each scatterer individually. This assumption, known from optics as the "Born approximation" can be accurate enough to generate the representations of the areas of interest.

Further, most surfaces imaged by the imaging module 316 can include large surfaces that produce diffuse reflections. Diffuse reflections scatter radiation in all directions. If superposition holds, this means that such a surface produces a scattering response that is an integral over the surface, where the integration operation assumes the surface is made up of an infinite-number of infinitesimally-small scatterers, which can be processed according to the previously described scatterers.

In various embodiments, the combined receive radar signal created by the virtual antenna formation module 314 comprises a plurality of perspectives of the field of view. Specifically, each of the perspectives can correspond to the field of view represented by a single response of the plurality of responses received by the receiver antenna array 310. For example, the combined receive radar signal can include a plurality of perspectives including a perspective of the field of view from a position of a receive antenna used to receive a radar signal corresponding to a specific response. Accordingly, the imaging module 316 can generate a representation of one or more areas of interest in the field of view based on a plurality of perspectives of the field of view included in the combined receive radar signal. Specifically, the imaging module 316 can generate a representation of one or more areas of interest in the field of view that accommodates one or more phase shifts in the responses received by the receiver antenna array 310.

Attributes rendered by the imaging module 316, as part of the representation of the field of view, can include voxels/attributes of voxels in one or more areas of interest in the field of view. Specifically, the imaging module 316 can be configured to identify physical properties of voxels in the one or more areas of interest. For example, the imaging module 316 can identify material characteristics of an object within the field of view. Further, the imaging module 316 can be configured to identify a reflectiveness of one or more voxels in the one or more areas of interest. This is advantageous as the reflectiveness can be used to measure reflectiveness of objects within the field of view. Specifically, the reflectivity of remote objects varies widely at mm-wave frequencies. For example, a scene may contain pixels whose reflectivity varies by up to 60 dB (1,000,000×). In identifying reflectiveness of voxels, the imaging module 316 can improve image quality in these scenarios. For example, the imaging module 316 can identify the locations of a certain number of high-intensity targets, e.g. which might be spectral reflections from metal on cars. As follows, a cancellation signal can be generated based on the reflectively to remove these high-intensity targets, sum it with our received signal, and re-run signal processing to resolve lower-intensity targets.

In various embodiments, to find the reflectivity at a specific voxel in space, the imaging module 316 can invert the scattering integral. Specifically, the imaging module 316 can perform a mathematical inversion of a representation of an area of interest in the field of view. In particular, the imaging module 316 can generate a representation of areas of interest by performing a scattering integral of a plurality of receive radar signals received at the receiver antenna array 310, and subsequently perform a mathematical inversion of the scattering integral. The imaging module 316 can do this in several ways, including deconvolution or matched filtering. Specifically, the imaging module 316 can perform a deconvolution of a representation of areas of interest in the field of view. For example, the imaging module 316 can perform a deconvolution of a scattering integral of a plurality of receive radar signals received at the receiver antenna array 310, and subsequently perform a deconvolution of the scattering integral to generate a representation of areas of interest in the field of view.

Further, the imaging module 316 can perform matched filtering in either the time-domain or the frequency-domain to ultimately generate representations of the areas of interest in the field of view. The imaging module 316 can perform this operation in the time-domain using what is known as backpropagation. Specifically, the imaging module 316 can generate a representation of areas of interest by performing matched filtering on a scattering integral of a plurality of receive radar signals received at the receiver antenna array 310. More specifically, the imaging module 316 can generate a representation of areas of interest by performing a time-domain or frequency-domain matched filtering on a scattering integral of a plurality of receive radar signals received at the receiver antenna array 310.

Specifically, the imaging module 316 can loop over all voxels to form an image. At each voxel, the imaging module 316 can loop over each waveform for each transmit-receive antenna combination. As part of these operations, the imaging module 316 can first subtract from the waveform the phase offset corresponds to the travel distance from this transmit antenna, to this voxel, and back to this receive antenna. This has the effect of interpolating the received waveform at the exact moment (time delay) corresponding to the range to that voxel. Specifically, the imaging module can effectively "select" the time delay corresponding to a voxel of interest.

The imaging module 316 can then begin to accumulate these waveforms as it loops over each transmit-receive antenna combination. In various embodiments, the word accumulated is used to emphasize that the sum of these waveforms is important, and that they may be discarded after summation. Because the imaging module 316 has "selected" the time delay corresponding to a voxel of interest, the waveforms from each transmit-receive antenna combination will add constructively if a target is present at that position. Conversely, if no target is present they will add destructively, e.g. contributions from other voxels can add destructively. The result is the intensity value for this voxel.

In various embodiments, as the imaging module 316 loops over transmit-receive pairs, each summation results in enhanced resolution about the point of interest. Specifically, subsequent waves continue to successively cancel more and more neighboring pixels, resulting in a "sharpening" or "focusing" process. If it is useful to perform more efficient computation of lower-resolution images, this process can allow the resolution or focus to be parameterized, much like turning the focus ring on a camera lens. By turning the ring to a "blurry" setting, images can be produced more quickly, which may be advantageous in some scenarios.

After looping over all transmit-receive pairs, the imaging module 316 can continue by moving to a new voxel, and the process can be repeated at that voxel. As this loop runs, a 3D volume of intensity values is generated, representing the scattering action that took place downrange. In various embodiments, this process of looping from voxel to voxel is analogous to the beamforming that takes place in a traditional SIMO phased array radar, or to the scanning action of a lidar. Hence, scanning with no moving parts is accomplished with a simple, highly-parallelizable system.

In various embodiments, the imaging module 316 can repeat this process over a plurality of voxels. A significant advantage that radar has over lidar is the ability to scan arbitrary volumes of the search space. Lidars use actuated mirrors to scan a laser beam. Because these are mechanical parts they have inertia, and require complicated and expensive actuators to control. Because the present accomplishes scanning without any moving parts, it can be performed without inertia ("instantaneous" on a mechanical timescale).

Because the imaging module 316 can effectively scan to arbitrary points in the scene, the focus ("gaze") on only particular regions of interest can be scanned. Specifically, the imaging module 316 can effectively optimize the voxel selection process. More specifically, rather than just looping over all voxels naively, the imaging module 316 can employ application-specific methods to perform a more intelligent scan. For example, one embodiment might perform "multi-resolution processing". First, a low-resolution scan is made, and areas of interest are identified. Depending on the application these could be areas of high intensity, high contrast, polarimetric signature, the geometric position of an estimated road surface, the interpolated position of a known tracked target from a prior frame, and so on. Once these features have been identified then subsequent higher-resolution passes can focus only on these regions and avoid computing voxels outside the regions of interest. This would allow faster frame processing. The systems herein can function to build an image with multiple levels of "focus", with the most detail reserved for only the most important regions of the scene. The choice of "importance" can be application-dependent.

In some embodiments, the imaging module 316 uses data from the virtual antenna formation module 314 to focus images in a cross-range dimension. A "cross-range dimension," as used herein, may include a dimension orthogonal to a range dimension. In some embodiments, the imaging module 316 may use phase information (e.g., where plurality of independent waveforms are frequency and/or phase divided) to focus an image in a cross-range dimension. The imaging module 316 may gather from the virtual antenna formation module 314 data such as how responses to the plurality of independent waveforms differ in frequency and/or phase. These frequency and/or phase differences may be used as the basis of focusing images. To illustrate with an example, the receiver antenna array 310 may receive responses to independent transmitted radar signals from the object 106. The antennas of the receiver antenna array 310 may be spatially separated from one another, and as a result, may receive responses at different points in time. The imaging module 316 may use such differences, alone or in combination with geometric properties (layout, number of antenna elements, spatial separation and/or orientation of antenna elements, etc.) of the receiver antenna array 310 to create a focused image in a cross-range dimension. In some embodiments, the imaging module 316 uses the difference in frequency and/or phase between responses to independent transmitted radar signals to create a focused image. The difference in frequency and/or phase may result from a difference in round-trip distance from each transmitter to the target and back to each receiver.

In using frequency and/or phase information to focus an image in a cross-range dimension, the imaging module 316 may use a round-trip time to a voxel downrange of it. As a result, in such embodiments, the imaging module 316 may account for the positions of transmit and receive antenna elements relative to one another (rather than the actual positions of transmit and receive antenna elements). The inventors have found that transmitter and receiver pairs that have the same round trip time to the voxel downrange will capture similar imaging information. The inventors have further found there are numerous (nearly infinite) numbers of transmitter and receiver positions that possess the same round trip time to a given target position.

In forming a representation of one or more areas of interest in the field of view, the imaging module 316 can generate three-dimensional (3D) image frames for the one or more areas of interest. Specifically, the imaging module 316 can form 3D representations of objects in 3D image frames of areas of interest in the field of view. For example, the imaging module 316 can form 3D representations of objects to show distances of the objects from the radar imaging system 102 in the field of view.

The imaging module 316 functions to image the field of view while accounting for motion relative to the field of view. The images may have various image attributes that are based, at least in part, on motion relative to the field of view and may provide the ability to image moving targets using radar. The images may include voxels representative of the field of view and constructed using data from motion relative to the field of view. Voxels may be characterized by, e.g., range values, angle values, and/or velocity values. In an embodiment, voxels are characterized by range values, angle values, and velocity values that correct for cell migration phenomena.

In an embodiment, the imaging module 316 functions to sample signal attributes of independent transmitted radar signals recovered from the virtual antenna formation module 314 (and, as noted herein, received at the receiver antenna array 310). The samples of a given pulse are referred to as "fast time" data of the field of view and may be arranged chronologically to represent the field of view at a given time. The imaging module 316 may additionally gather positions and recovered independent waveforms and/or any information gained from their interaction with a field of view virtual antenna array elements from the virtual antenna formation module 314. These values may be referred to as "spatial" data for the field of view and may be arranged to form spatial values for the field of view at a given time. In this embodiment, the imaging module 316 further functions to gather each pulse received at the receiver antenna array 310, which as noted herein, may represent responses to independent transmitted radar signals at a given time. These values may be referred to as "slow time" data of the field of view and may similarly be arranged chronologically to represent the field of view for a given time.

The imaging module 316 functions to use fast time data, slow time data, and spatial data as the basis of voxels of the field of view. In an embodiment, the imaging module 316 uses fast time values of a field of view (e.g., samples of signal attributes of independent transmitted radar signals recovered from the virtual antenna formation module 314) as the basis of range values of voxels. In some embodiments, this may include de-chirping sampled received signals, matched filtering of sampled received signals, etc. The imaging module may further use spatial data for a field of view as the basis of angle values of voxels. In some embodiments, this may include backprojection of recovered independent waveforms and/or any information gained from their interaction with a field of view along a spatial axis. The imaging module 316 may additionally use slow time data as the basis of relative velocity values of voxels. In various implementations, the imaging module 316 performs a frequency transformation (e.g., a Fourier transform) on the slow time data to derive relative velocity values.

Figure 2D:
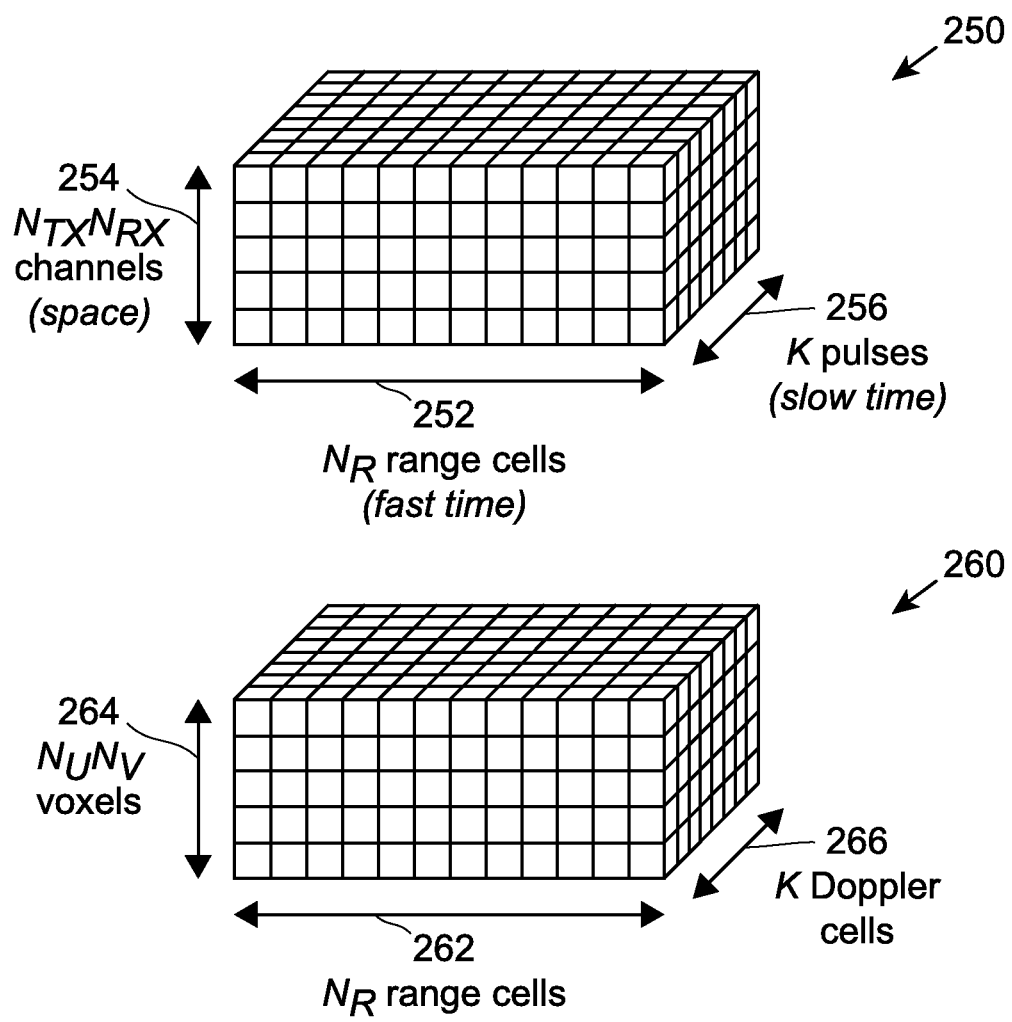
FIG. 2D shows conceptual representations of a scene measurement data structure and a voxel data structure.

FIG. 2D shows conceptual representations of a scene measurement data structure 250 and a voxel data structure 260. The scene measurement data structure 250 and voxel data structure 260 represent examples of data arrangements managed by the imaging module 316 when imaging the field of view. The scene management data structure 250 includes fast time data 252 arranged along a first axis, spatial data 254 arranged along a second orthogonal axis, and slow time data 256 arranged along a third orthogonal axis.

The fast time data 252 represents samples of pulses recovered from the virtual antenna formation module 314. They are arranged chronologically to form the first axis. Additionally, as the radar imaging system 102 comprises a MIMO system, there are a plurality of measurements that correspond to a virtual antenna array; these virtual antenna array elements may be arranged to form the second axis. The multiple pulses received at the receiver antenna array 310 that form single measurement across the receiver antenna array 310 at a given time may be arranged chronologically to form the third axis.

The voxel data structure 260 includes range values 262 arranged along a first axis, angle values 264 arranged along a second orthogonal axis, and relative velocity values 266 arranged along a third orthogonal axis. The range values of voxels can represent range properties of an image within the field of view. The angle values of voxels can represent angles characterizing an image within the field of view, and the relative velocity values 266 can represent velocit(ies) of the radar imaging system 102 relative to the each voxel.

The inventors have noted that it is helpful for the imaging module 316 to accommodate cell migration phenomena where the relationships between relative velocity and range (e.g., caused by relative motion in the range direction) cause offsets in range or velocity values. For instance, when slow time data 256 becomes transformed into relative velocity values 266, the output of a frequency transformation on slow time data may relate velocity to range. As a result, a target's range may appear to be offset by an error term that is dependent on a target's velocity. In addition, if the target is moving fast enough, it may transit through multiple range bins during one measurement. This is known as "range migration". A similar migration phenomenon exists on the Doppler axis. Due to this same error term, the term used for estimating target velocity estimation is offset by an amount dependent on the target's range. This also means that the target may appear in multiple Doppler velocity bins during one measurement, a phenomenon known as "Doppler migration". Together these can be called "cell migration". The longer the integration time that is used to take a measurement, the worse these errors become. Also, the finer the resolution of the radar in range or Doppler, the worse both migration phenomena become, since it is takes less movement to smear across smaller cells. Fortunately, we can perform a calibration to correct this.

The imaging module 316 accounts for cell migration using one or more calibration techniques. An example of a calibration method can include slow-time scaling (e.g., a Keystone transform), etc. In some embodiments, a Keystone transform is attractive because it does not assume a priori knowledge of any target velocity, nor does it rely on per-target tracking or estimation.

The slow-time interpolation/slow-time rescaling/range velocity rescaling (e.g., Keystone transform) removes frequency-velocity coupling by rescaling the slow-time axis as a function of fast-time frequency by $$\hat{T}_{n_{st}} = \frac{f_c - f_b}{f_c} n_{st} T_{\mathit{eff}}$$

Here, n_st is index of the current slow time pulse (the index along the slow time axis in the input datacube shown above) and T_eff is the amount of time it takes to collect one full slow time measurement (the slow time sampling interval). For example in radar systems utilizing time-division multiplexing this time is the length of a single pulse times the number of transmitters.

The scaling term contains f c the starting carrier frequency of the transmitted waveform and f_b the fast time baseband frequency, and is a function of which fast time range bin we are in. The fast time baseband frequency f_b lies in the range +/−B/2, where B is the bandwidth of the transmitted waveform.

At f_b=0 the slow-time dimension is unchanged. For f_b<0 it is expanded in slow time, while for f_b>0 it is contracted. For f_b<0 this will have the effect of stretching the sample-to-sample phase progression over a longer time interval, thus reducing the time-rate of phase change and hence the slow-time frequency. For f_b>0 the slow-time frequency will be increased.

The imaging module 316 may use a calibration is as follows: first we perform the fast time Fourier transform (pulse compression). We then apply the Keystone transform as described above—a rescaling in the slow-time dimension. This results in a new function that is the fast-time Fourier transform and slow-time inverse Fourier transform of the correctly calibrated result. Hence, an inverse Fourier transform in the range dimension and a forward Fourier transform in the slow time dimension will yield fully-focused, calibrated data with no degradation in either range or Doppler. The range-Doppler error term has been successfully calibrated out.

The motion compensation and Doppler correction calibration methods discussed so far apply the compensation/correction to all the cells in a scene independent manner. Although this rids us of the necessity of having a priori knowledge about the target velocity, it also increases computational complexity.

The embodiments herein provide a way to improve the computational performance by using the uncalibrated (smeared) range-Doppler image to establish coarse estimation of target voxel position in range-Doppler space. This uncalibrated image gives us an idea which Doppler and range bins to focus on for calibration. That way, rather than applying compensation to all the cells, we can apply compensation only to the cells identified from the uncompensated image. This will reduce the computational complexity of compensation substantially.

Figure 2E:
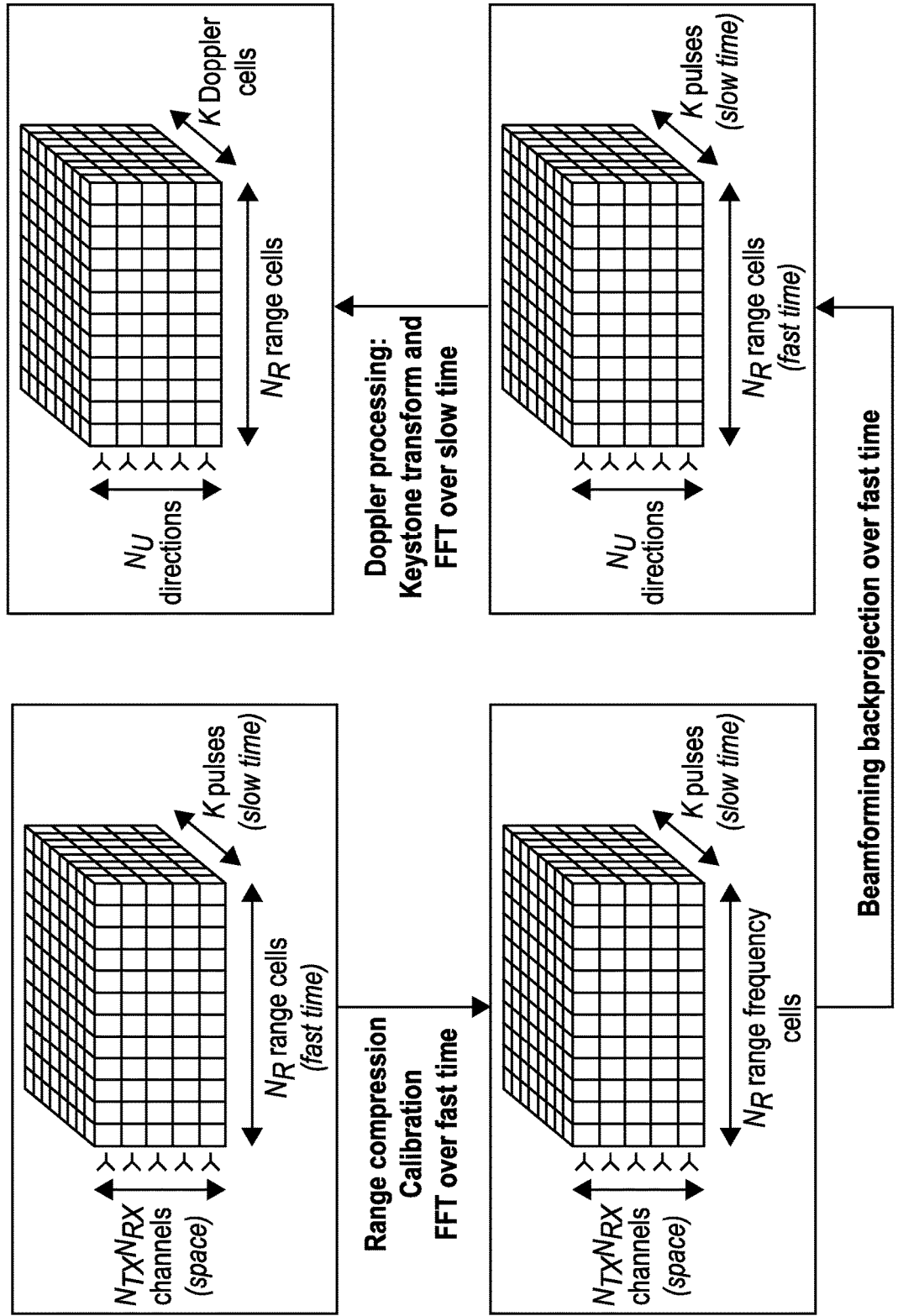
FIG. 2E shows conceptual representations of a process for radar imaging.

FIG. 2E shows conceptual representations of a process for radar imaging that may be implemented by the imaging module 316. Spatial data, fast time data, and slow time data may be compressed and calibrated. A Fast Fourier Transform (FFT) may be provided over fast time values. A resulting voxel data structure may be obtained and beamformed. It may be backprojected over fast time values. Doppler processing, Keystone transformations, and/or FFT over slow time values may be performed to accommodate effects of velocity on range.

The imaging module 316 can determine properties of an object within the field of view. In particular, the imaging module 316 can determine properties of an object within the field of view, as discussed previously, based on different constructive and destructive interferences in the receive radar signals created by the object within the field of view. For example, the imaging module 316 can determine whether a representation of an area of interest in the field of view represents constructive contributions by an object from the plurality of independent waveforms transmitted into the field of view. Similarly, the imaging module 316 can determine whether the representation of the area of interest in the field of view represents destructive contributions by the object from the plurality of independent waveforms transmitted into the field of view. Subsequently, the imaging module 316 can determine one or more properties of the object within the field of view based on either or both the constructive contributions and the destructive contributions in the representation of the area of interest, e.g. based on the scattering properties of the object. As discussed previously, this is advantageous over current object sensing systems, e.g. lidar, which are unable to identify actual properties, e.g. material characteristics, of objects in a field of view.

Further, the imaging module 316 can determine whether an object is within the field of view, as discussed previously, based on different constructive and destructive interferences in the receive radar signals created by the object if it is in the field of view. For example, the imaging module 316 can determine whether a representation of an area of interest in the field of view represents constructive contributions by an object from the plurality of independent waveforms transmitted into the field of view. Similarly, the imaging module 316 can determine whether the representation of the area of interest in the field of view represents destructive contributions by the object from the plurality of independent waveforms transmitted into the field of view. Subsequently, the imaging module 316 can determine whether the object is within the field of view based on either or both the constructive contributions and the destructive contributions in the representation of the area of interest.

Additionally, the imaging module 316 can determine an imaging intensity within the field of view, as discussed previously, based on different constructive and destructive interferences in the receive radar signals received from the field of view. For example, the imaging module 316 can determine whether a representation of an area of interest in the field of view represents constructive contributions from the plurality of independent waveforms transmitted into the field of view. Similarly, the imaging module 316 can determine whether the representation of the area of interest in the field of view represents destructive contributions from the plurality of independent waveforms transmitted into the field of view. Subsequently, the imaging module 316 can determine an imaging intensity within the field of view based on either or both the constructive contributions and the destructive contributions in the representation of the area of interest. As discussed previously, an imaging intensity can include an intensity of the radar signals received by the receiver antenna array 310 from objects based on reflectivity of the objects in the field of view. For example, metal on a car, owing to its high reflectivity, can be identified as a high intensity object in the field of view. Subsequently, the signals received from the high intensity objects can be cancelled out, e.g. using signal processing, in order to resolve lower intensity targets at higher resolutions.

In forming a representation of an area of interest in the field of view, the imaging module 316 can enhance resolution near the area of interest in the field of view. Specifically, the imaging module 316 can successively cancel one or more responses the plurality of independent transmitted radar signals received from areas in the field of view proximate to the area in the field of view. For example, if an area of interest corresponds to an object, then the imaging module 316 can cancel receive radar signals received from areas around the object in order to enhance resolution in a representation of the object in the field of view.

Further, in forming a resolution of an area of interest in the field of view, the imaging module 316 can control a focus of a resolution near the area of interest in the field of view. Additionally, the imaging module 316 can provide a parametrized focus of a resolution near an area of interest in the field of view in order to control the resolution near the area of interest according to various imaging parameters. For example, the imaging module 316 can adjust the focus to decrease the resolution near an area of interest in the field of view, e.g. create a blurry image around the area of interest. In turn, this utilizes less computational resources, which can be advantageous in processing large amount of data for purposes of object sensing and characterization.

Additionally, the imaging module 316 can perform a plurality of scans of a plurality of areas of interest in the field of view at different resolutions to identify different attributes in the field of view. Specifically, the imaging module 316 can scan a plurality of areas of interest in the field of view at a first resolution to identify attributes to image at a different resolution, e.g. higher resolution. Subsequently, the imaging module 316 can scan the attributes in the areas of interest in the field of view at the higher resolution. This allows the imaging module 316 to reduce utilized computational resources, as the entire areas of interest do not need to be scanned at the higher resolution.

As discussed previously, in providing a representation of an area of interest in the field of view, the imaging module 316 can identify properties of objects in the area of interest. Specifically, the imaging module 316 can identify polarization properties of objects in an area of interest in the field of view. Polarization properties can include polarizations of objects can include polarizations of radar signals received from the objects in response to the plurality of independent radar signals transmitted into the field of view. Subsequently, the imaging module 316 can determine material properties of objects in the field of view based on the polarization property.

To facilitate imaging by the imaging module 316 based on polarization properties, one or more transmit antennas of the transmitter antenna array 308 can be configured to emit only horizontally polarized radiation. The transmitted signal can propagate through space and encounters one or more objects which scatter the radiation. Some of this radiation, as described extensively herein, is scattered back toward the receiver antenna array 310. To measure the polarization, corresponding to the polarization properties, the radar imaging system 102 can use two receiving antennas, one that receives predominantly vertically-polarized radiation, and another antenna that receives predominantly horizontally-polarized radiation. These oppositely polarized antennas can be printed dipole antennas or bowtie antennas oriented perpendicular to each other.

The object detection module(s) 318 functions to determine whether or not an area of interest includes an object. Specifically, the object detection module(s) 318 can determine whether or not an area of interest in a field of view includes an object based on a representation area of interest generated by the imaging module 316. In determining whether or not an area of interest includes an object, the object detection module(s) 318 can determine characteristics of the detected object in the area of interest. For example, the object detection module(s) 318 can determine an actual size of an object detected in the field of view. Further in the example, the object detection module(s) 318 can determine the actual size of the object based on a distance from the object to the radar imaging system 102, as included as part of the representation of an area of interest in the field of view. Further, in determining whether or not an area of interest includes an object, the object detection module(s) 318 can classify an object as a specific object type. For example, if a detected object has the shape of a specific car, then the object detection module(s) 318 can classify the object as the specific car.

The vehicle management module(s) 320 function to provide instructions to manage a vehicle based on a representation of an area interest in a field of view that is generated by the imaging module 316. Specifically, the vehicle management module(s) 320 can provide instructions to manage a vehicle based on an object detected in a representation of an area of interest in the field of view by the object detection module(s) 318. For example, based on an identified speed of an object in the field of view, e.g. by the object detection module(s) 318, the vehicle management module(s) 320 can provide instructions to the vehicle to cause the vehicle to avoid a collision with the object.

Figure 5:
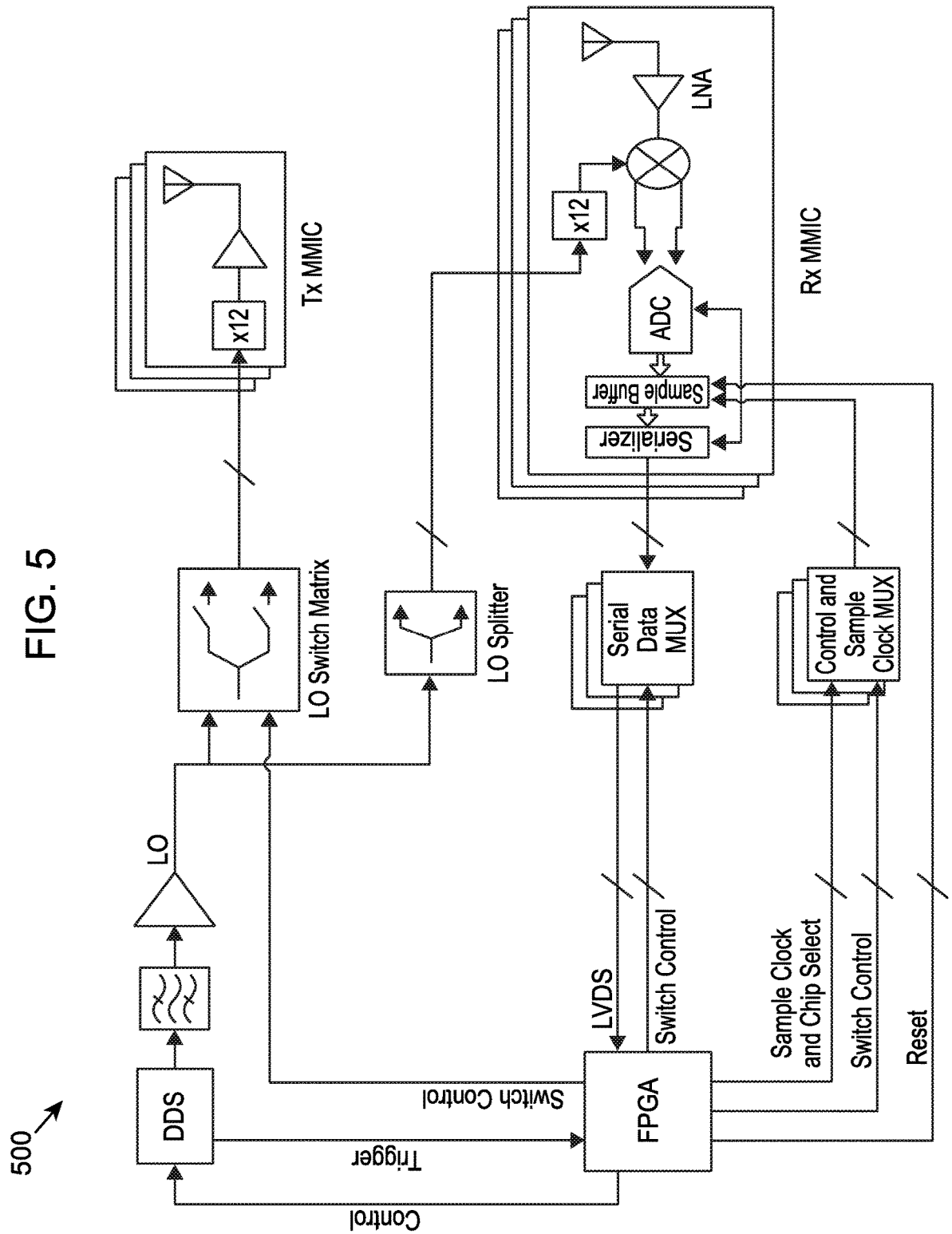
FIG. 5 shows an example MMIC radar system.

FIG. 5 shows an example MMIC radar system 500. Specifically, the example MMIC system 500 can be used to implement the radar imaging system 102, e.g. for purposes of detecting and characterizing objects in a field of view using radar.

In this example, an FPGA is the central computing node of the MIMIC radar system 500. It is noted that the central computing node may include a Graphics Processing Unit (GPU), a microprocessor, a microcontroller, an Application Specific Integrated Circuit (ASIC), or other processing unit. This chip runs all control and signal processing firmware. The transmission signal path begins at a direct digital synthesis (DDS) circuit controlled by firmware running on the FPGA. This firmware triggers the DDS to generate a sine wave that is frequency-modulated according to, for example, one of the modulation schemes shown in FIG. 4. DDS is used because of its high accuracy, low phase noise, and ability to generate arbitrary waveforms. Different modulation schemes will be advantageous for different situations, for example imaging at long or short range, or imaging at different levels of resolution (multiresolution imaging). Note that resolution could be in range, spatial dimension, or in Doppler frequency. It is an advantage that the modulation scheme can be easily changed on the fly depending on the real time imaging requirements of the system.

After DDS, this waveform is bandpass filtered to remove digital modulation artifacts and is then amplified. The signal at the output of the amplifier is the system Local Oscillator (LO). This is a stable master reference clock for the whole system. The DDS circuit also generates a periodic trigger pulse, which is connected to the FPGA. This pulse signals as the modulation cycle is repeating. For example with reference to FIG. 4, this could be at the start of each sawtooth, or after one up or down cycle of the triangle. This trigger is used to synchronize data acquisition, as described later.

As discussed previously, the technology described herein is designed for low cost and high reliability by limiting the number of high-frequency signals that need to be transferred across the design. In the present embodiment, the amplified LO signal is the only high-frequency analog signal used in the circuit. This signal is fanned out to all transmitter and receiver components. This signal can be transferred using low cost signal paths, such as printed circuit elements like microstrips and striplines. Further, to limit cost, this LO signal will operate at a lower frequency than the system carrier frequency. Frequency multipliers can multiply this signal up to the carrier frequency as needed. This LO can be in the range around 6 GHz.

The MIMO signal processing used in MMIC system 500 relies on the transmitted signals being independent so that they can be separately recovered upon reception. To make these transmitted signals independent they may be separated in time, space, code, or frequency. In one embodiment, the transmitted signals can be made independent by separating them in time. Specifically, the transmitted signals can be made independent through time division multiplexing (TDM) implemented by only switching on a single transmitter at a time. This is advantageous, as it simple to implement and eliminates the need to duplicate the DDS circuit. In order to implement TDM, the LO signal can connect to a switch matrix. This block can receive a single input and switches it to only one of a plurality of outputs. Each of these outputs can be connected to a single individual transmitter MMIC distributed around the array. The switch matrix can be controlled by digital control lines from a FPGA.

A transmitter of the array can be active if it is receiving the LO signal from the switch matrix. So, to implement TDM the FPGA can toggle the switch matrix to cycle through all of the transmitters. For each transmitter, one full FM modulation cycle is sent out, and the response to these transmissions is recorded from all receive antennas. If the system contains $N_{Tx}$ transmitters and $N_{Rx}$ receivers, this means the system 500 can have $N_{Tx} \times N_{Rx}$ recorded waveforms available for processing at the end of one complete measurement interval (a "frame"). Each recorded waveform can consist of a number of discrete digital samples, sampled according to the interval set by the sample clock. For example, the number of samples per waveform is 1024.

Once the FPGA firmware has switched the switch matrix to pass the LO to the active transmitter, the FPGA firmware can then trigger the DDS to generate an FM waveform according to the current modulation scheme. This LO waveform can pass through the switch matrix to the enabled transmitter MMIC where it can be multiplied up to carrier frequency. The carrier frequency can be 96 GHz. This carrier frequency can then pass through a power amplifier and out through a transmit antenna. As shown in FIG. 5, this antenna can be located on a semiconductor die. Alternatively, this antenna can be external and proximate to the semiconductor die, for example on a printed circuit board.

The transmitted radiation can then be radiated out into free space by the transmit antenna connected to the currently-active transmit MMIC. Some portion of this radiation can reflect off of a plurality of remote scatterers, return, and be received by the receivers in the array. A highly-integrated mixed signal receiver implemented as a single monolithic microwave integrated circuit (MIMIC) can be used to receive the reflected portion of the radiation. This chip can combine in one unit the RF front end with an ADC, a sample buffer, and a serial interface. In another embodiment we use commercial off the shelf (COTS) MMICs and ADCs. Each of these implementations is described next.

As described previously, a main driver of cost is the need to transfer high-frequency signals around the distributed antenna array. In order to limit this, a highly integrated mixed-signal MMIC receiver is shown in FIG. 5. This receiver can take, as input, RF at carrier frequency and produce, as output, serial digital samples.

Signals entering the receiver can be coupled in through the receive antenna. In one embodiment, this antenna is located on the semiconductor die, as shown in FIG. 5. In an alternative embodiment this antenna is external to the semiconductor, for example on a printed circuit board. The receiver chip also receives the LO signal through a passive splitter. As in the transmitter MMIC, this LO signal is multiplied up to carrier frequency.

The received signal can pass through a low noise amplifier (LNA) and into a mixer. The mixer can combine the received signal with the multiplied LO signal. The mixer output is a beat frequency signal that is proportional to the range of the target scatterers, as previously discussed. The mixer can then produce in-phase (I) and quadrature (Q) outputs. Together these constitute the intermediate frequency (IF) waveform.

As discussed previously, a challenge in the field is designing an array antenna system capable of dealing with the huge amounts of data that result when performing digital sampling on a plurality of array elements with wide bandwidth. The present system 500 contains some specific features that address this problem. In particular, the integrated receive MIMIC contains an onboard ADC and sample buffer. Upon being triggered, each receiver can record a specified number of samples of its IF waveform, storing them locally for later readout. Because these samples are stored locally, they do not need to be transferred through a high-speed data path at the rate that they are sampled.

In order to receive meaningful data from an antenna array, the samples taken from all antennas should be sampled at the same time. Further, sampling should be precisely timed to the same master sample clock, so that in later signal processing stages the digital samples can be compared in phase ("coherently"). Normally this creates the need for a huge data "pipe" with enough capacity for samples from all receive antennas to flow at full speed into a digital processor, for example an FPGA or DSP. This digital processor then requires significant time to do all the computation needed to perform range compression, beamforming, and generate an image. During this computation time, the data pipe sits idle, waiting for the digital processor to be ready to accept more samples. This creates the situation where a high-bandwidth digital system records bursts of samples, then sits idle most of the time. This duty cycle can be on the order of 10,000 units of idle time for every unit of active time performing data transfer. The system 500 can solve this problem by capturing, digitizing, and storing the data from each receiver locally at that receiver. This data can then be read out at the rate it is needed for processing, not at the rate that is needed for sampling.

Figure 6:
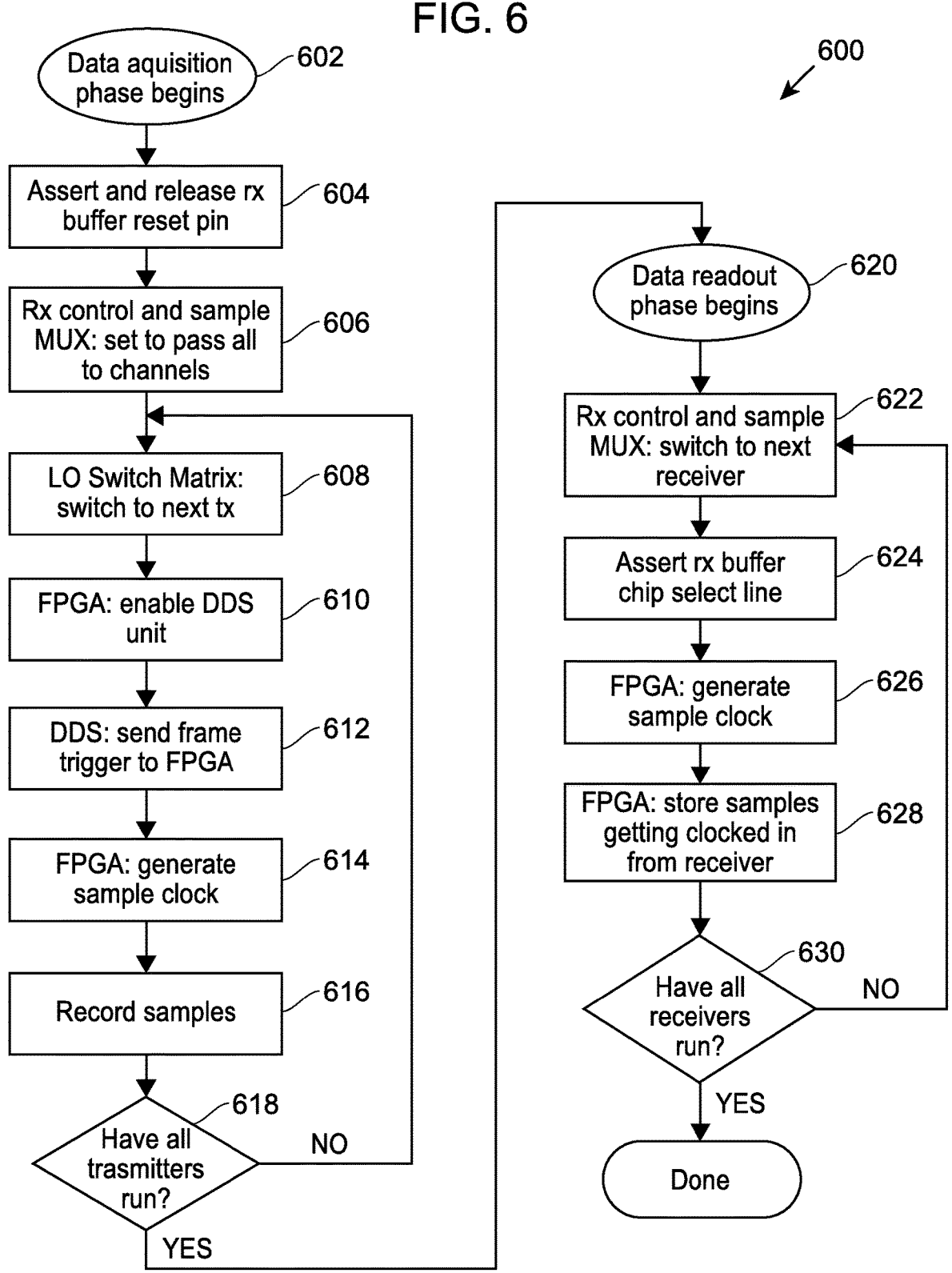
FIG. 6 illustrates an example frame capture method using an integrated receiver MMIC.

FIG. 6 illustrates an example frame capture method 600 using an integrated receiver MMIC. Specifically, the method 600 shown in FIG. 6 can be implemented by the MMIC system 500 shown in FIG. 5. The method 600 shown in FIG. 6 is provided by way of example, as there are a variety of ways to carry out the method. Additionally, while the example method 600 is illustrated with a particular order of steps, those of ordinary skill in the art will appreciate that FIG. 6 and the modules shown therein can be executed in any order and can include fewer or more modules than illustrated.

First, at step 602, the data acquisition phase begins. Specifically, at step 604, sample buffers in all receive MMICs are cleared by asserting and releasing a reset pin. Next, at step 606, the Control and Sample Clock MUX can be set to pass all channels. This means the sample clock will trigger all analog to digital converters (ADCs) simultaneously. This produces the simultaneous sampling used to process the array signals coherently. Next, at step 608, the LO Switch Matrix is toggled to the first transmitter. As noted before, this switch matrix can implement the previously described TDM scheme of selecting only one transmitter at a time. Next, at step 610, the FPGA enables the DDS unit. In one embodiment, the DDS unit, at step 612, sends the FPGA a trigger signal when the FM ramp begins. In another embodiment, this trigger signal is not necessary because the DDS unit is immediately stable, or the FPGA contains calibration data to know when the DDS is stable without closed-loop feedback.

When the FPGA receives the start-of-ramp trigger signal, at step 614, it begins generating the ADC sample clock. This clock passes through the Control and Sample Clock MUX to all receiver MMICs. It is important that the ADCs can all take measurements at the same time. In one embodiment all traces leaving the Control and Sample Clock MUX are the same length to prevent clock jitter between the ADCs, despite being physically distributed across the design. In an alternative embodiment these traces are allowed to be of different lengths. In this embodiment a calibration routine is able to correct for the different lengths of these traces, by applying a phase correction in software. The reason to allow the traces to be different lengths would be to route them for mechanical convenience and/or to prevent crosstalk and EMI. At step 616, these samples can be recorded.

After the FM ramp has finished, the FPGA can cease generating the sample clock. At this point the sampled waveforms from the first transmission are present in the sample buffers of all receive MMICs. The method then continues to decision point 618, where it is determined if all transmitters have run. If transmitters still need to be run, then the LO Switch Matrix is switched to the next transmitter, another FM ramp is generated, the sample clock runs, and again the IF response is recorded into the sample buffers of all receive MMICs. Then the LO Switch Matrix is switched to the next transmitter, and the process can repeat again starting at step 608 until all transmitters have been activated once.

In one embodiment, the number of samples taken per transmission is 1024 and they are recorded with 14-bit resolution. At this point the onboard sample buffers can each contain $N_{Tx} \times 14 \times 1024$ bits of data. Together these sample buffers can contain all of the data used by the system to generate one frame of 3D data of the environment.

Next, at step 620, the data readout phase begins, as shown in the method 600 in FIG. 6. As noted previously, the use of the distributed memory architecture allows this phase to be decoupled from the array data acquisition phase. This can represent the main cost savings of the current design: the array waveforms that must be simultaneously sampled and captured quickly in order to allow coherent processing can be downloaded from the receive MMICs slowly, eliminating many high-speed signal paths found in current designs. This allows for use of a much cheaper FPGA, because it can be sized by the amount of computation needed, which is comparatively cheap. In contrast, in a traditional circuit, the FPGA would need to be sized by available I/O, which is expensive, especially at gigabit speeds.

To read data out of all the receive MMICs, at step 622, the Receive Control and Sample Clock MUX is switched to the first receiver. The Serial Data MUX is also switched to the first receiver. At step 624, the FPGA asserts the chip select line of the first receiver and, at step 626, starts generating a sample clock. Because the chip select line is asserted, this chip select line clocks samples out of the Sample Buffer, though the Serial Data MUX, and into the FPGA. In an alternative embodiment of the invention, the FPGA does not generate the sample clock, and instead the Serializer connected to the Sample Buffer generates a serial data clock itself, and this clock connects to the FPGA through the Serial Data MUX. In this embodiment the FPGA can receive both LVDS serial data and this differential serial clock through the receiver MMIC. At step 628, the samples for the receiver are stored.

Once the samples have been read out of the receiver, at decision point 630, it is determined if all of the receivers have been run. If it is determined that one or more additional receivers need to be run, then the FPGA can switch the Serial Data MUX and Control and Sample Clock MUX to the next receiver and the data readout process can begin for another receiver, at step 622. The samples can then be read out of that receiver. This process can repeat until all samples have been read out of all of the receivers. At this point, the FPGA contains a complete frame of all samples from all receivers and is ready to begin signal processing.

Note that the FPGA can be performing signal processing on the data from the previous frame while the entire process of FIG. 6 is going on. The data acquisition interval time can be fixed, based on the maximum range of the system, and hence the longest round-trip time that a signal will take. The signal processing required to generate a frame, e.g. a 3D frame, will in all likelihood take far longer than this round-trip time. Hence, the data readout stage needs to only be fast enough to have a frame of data ready for the FPGA at the end of the signal processing stage. Again, this allows for significant cost savings. By decoupling the time interval needed for data acquisition from that needed for data readout, the needed bandwidth of the MIMIC system 500 is substantially reduced.

Figure 7:
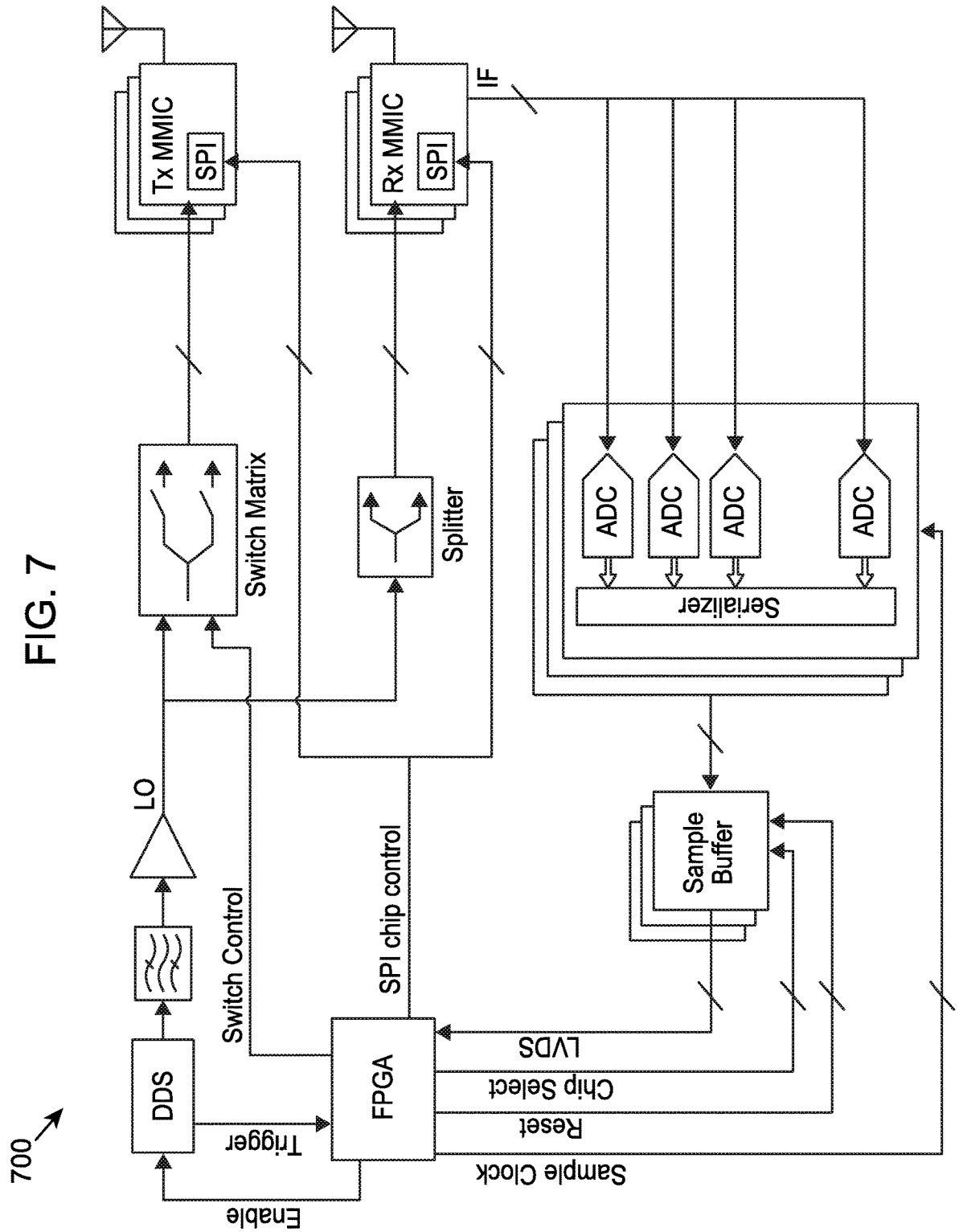
FIG. 7 shows an example of a COTS MMIC radar system.

FIG. 7 shows an example of a COTS MMIC radar system 700. The COTS MMIC system 700 shown in FIG. 7 can be used to implement the radar imaging system 102. The COTS MMIC system 700 does not necessarily rely on an integrated mixed signal receiver IC. Instead, the COTS MMIC system 700 can perform similar functionality as the MMIC system 500 while using commercially-available off the shelf (COTS) ICs. In operation, the COTS MMIC system 700 uses local sample buffers to store data in order to limit the number of high-speed signal paths in the circuit. However, the degree of integration is different from the MMIC system 500. The design of the COTS MMIC system 700 shown in FIG. 7 is merely an example, and the COTS system 700 could be implemented using either discrete ICs or an intermediate degree of integration, using COTS chip dies mounted together using system in package (SIP) technology.

Similar to the MMIC system 500, in the COTS MMIC system 700 an FPGA is the central computing node of the circuit, and again it is connected to a DDS circuit which is used to generate a FM signal that is modulated according to an applicable scheme, such as the schemes shown in FIG. 4. Again this waveform is bandpass filtered and amplified to create the system local oscillator (LO). As before, the DDS also generates a periodic trigger pulse and sends it to the FPGA.

The LO signal is connected to a switch matrix which again implements TDM by activating one transmitter at a time. In the COTS MMIC system 700, these transmitters are implemented by COTS transmitter ICs. These chips take in the LO signal and multiply it up to carrier frequency. These chips also typically contain a serial peripheral interface (SPI) configuration port. This is a low-speed serial port that is used to read and write registers that control various aspects of chip operation, such as enabling the transmitter, setting power amplifier gain, or reading the chip die temperature. In the COTS MIMIC system 700, these low speed signals are connected using excess general purpose I/O (GPIO) pins on the FPGA.

As before, once the FPGA firmware has switched the switch matrix to pass the LO to the active transmitter, it then triggers the DDS to generate an FM waveform according to the current modulation scheme. This LO waveform passes through the switch matrix to the enabled transmitter MIMIC and is multiplied up to carrier frequency, is amplified, and transmitted out through an antenna. As shown in the example COTS MIMIC system 700 shown in FIG. 7, this antenna can be external to the transmit MIMIC.

Again, the transmitted radiation is radiated out into free space by the transmit antenna connected to the currently-active transmit MMIC. Some portion of this radiation can reflect off of a plurality of remote scatterers, return, and be received by the receivers in the array. This radiation can be received by antennas on a printed circuit board and coupled into the COTS receiver MMICs. There it is amplified by an LNA. The receiver MMICs also receive the LO signal through a passive splitter. This signal can be multiplied up to carrier frequency and mixed with the LNA output to produce the beat frequency IF signal. Unlike the MIMIC system 500, there is no onboard ADC configured to digitize this signal and store it in an onboard sample buffer. Instead, the COTS MMIC system 700 uses an external ADC chip and external sample buffer to digitize and store the signal.

Figure 8:
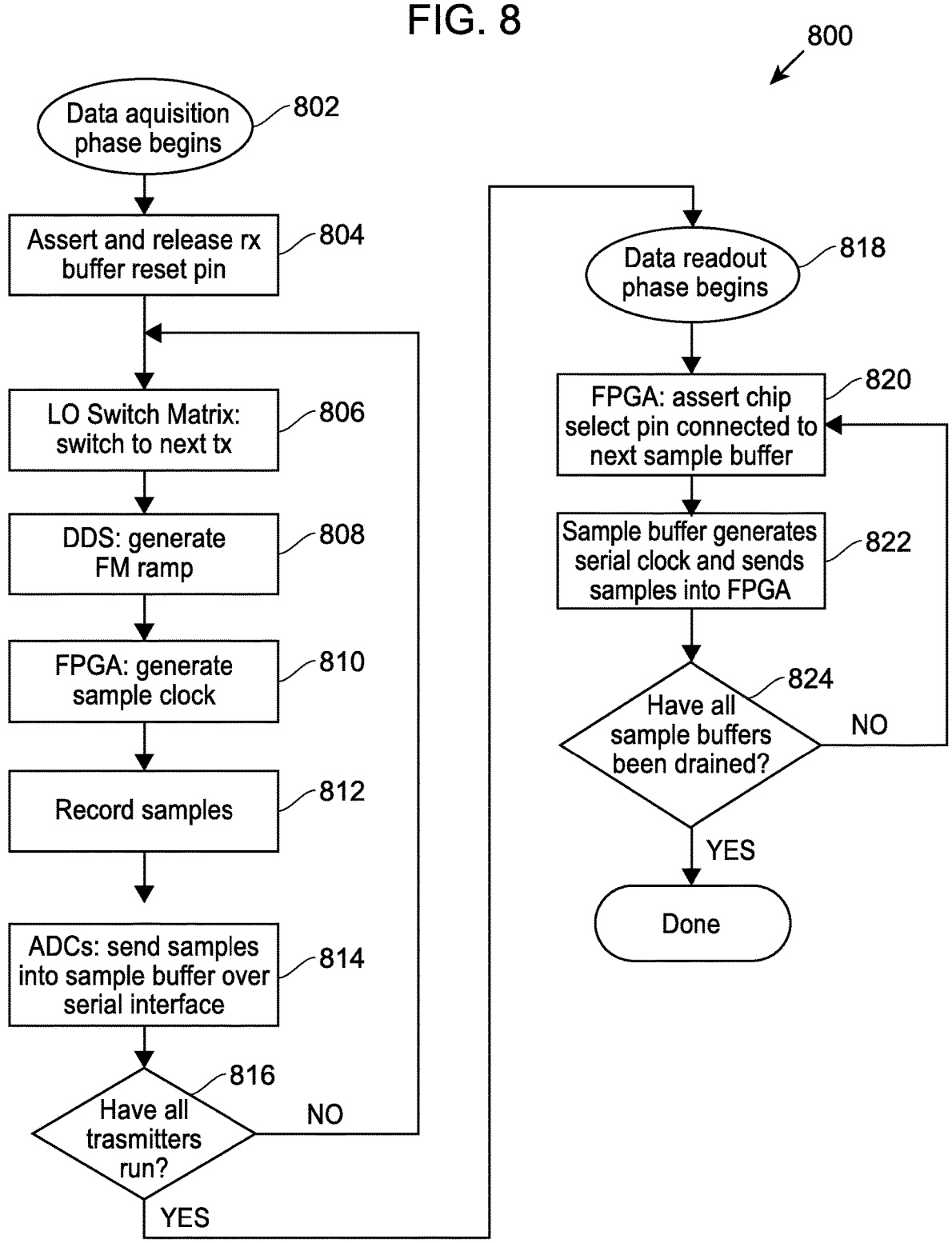
FIG. 8 illustrates an example frame capture method using a COTS chipset.

FIG. 8 illustrates an example frame capture method 800 using a COTS chipset. Specifically, the method 800 shown in FIG. 8 can be implemented by the COTS MMIC system 700 shown in FIG. 7. The method 800 shown in FIG. 8 is provided by way of example, as there are a variety of ways to carry out the method. Additionally, while the example method 800 is illustrated with a particular order of steps, those of ordinary skill in the art will appreciate that FIG. 8 and the modules shown therein can be executed in any order and can include fewer or more modules than illustrated.

At step 802, the data acquisition phase begins. Specifically, at step 804, the FPGA firmware clears the sample buffers by asserting and releasing a reset pin. In various embodiments, the Control and Sample Clock MUX can be set to pass all channels. Next, at step 806, the LO switch matrix is toggled to the first transmitter. At step 808, the FPGA enables the DDS unit. Optionally, at step 808, the DDS unit can send the FPGA a trigger signal when the FM ramp begins. Alternatively, this trigger signal is not necessary because the DDS unit is immediately stable, or the FPGA contains calibration data to know when the DDS is stable without closed-loop feedback.

At step 810, the FPGA begins generating the ADC sample clock. The FPGA can begin generating the ADC sample clock signal when it receives the start-of-ramp trigger signal. This clock triggers all ADC channels to sample their respective IF signals simultaneously. These ADCs generate streams of serial data which, at step 814, flow into one or more sample buffers, e.g. over a serial interface. In one embodiment these sample buffers are implemented with FPGAs.

After the FM ramp is finished, the FPGA ceases generating the sample clock. At this point the sampled waveforms from the first transmission are sitting in the sample buffer(s). It is then determined, at decision point 816, whether all transmitters have run. It is determined additional transmitters have not been run, then the process returns back to step 806, where the LO Switch Matrix is switched to the next transmitter, another FM ramp is generated, the sample clock runs, and again the IF samples are recorded into the sample buffers. Then the LO Switch Matrix is switched to the next transmitter, and the process repeats until all transmitters have been activated once.

After it is determined that all transmitters have been run, at decision point 816, then the data readout phase begins at step 818. At this point the sample buffers together contain the data used by the system to generate one frame of 3D data. Next the data readout phase begins. This data readout can occur slowly. It need only proceed as quickly as needed to have all data ready at the end of the frame signal processing period.

Data is read out of all sample buffers by asserting a chip select line on each at step 820. Depending on the throughput available in the main FPGA, one or more chip selects may be asserted simultaneously. At step 822, the sample buffer then starts generating a clock signal and outputs all stored samples from ADC channels into the FPGA, e.g. through a serial interface. This process continues in a loop between decision point 824 and step 820, until all receivers have been run. Once all samples have been read out of all sample buffers, the FPGA contains a complete frame and is ready to begin signal processing.

Figure 9A:
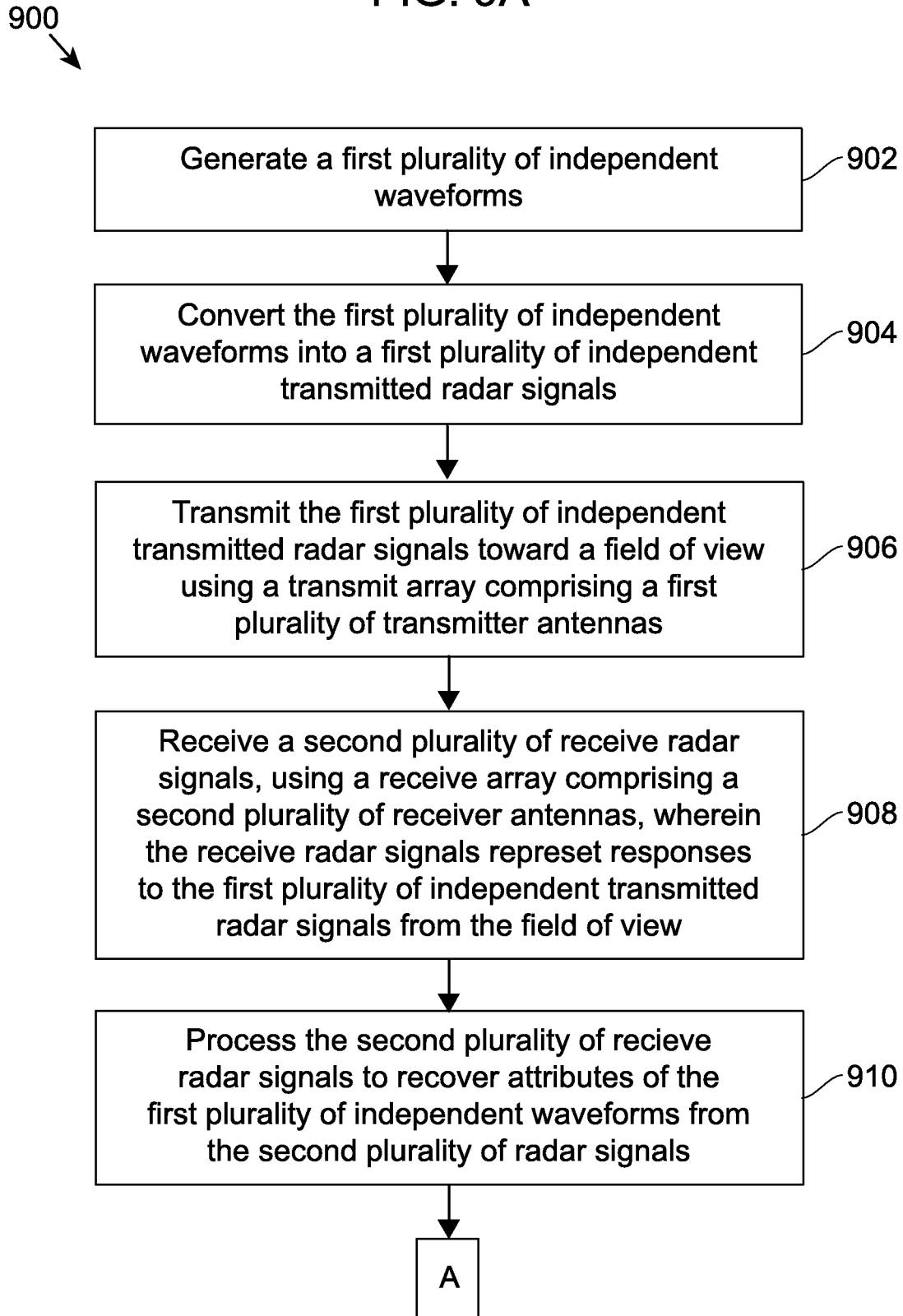

FIGS. 9A and 9B illustrate an example method 900 for performing object sensing and characterization using radar. Specifically, the method 900 shown in FIGS. 9A and 9B can be implemented by the systems described herein, including the radar imaging system 300 shown in FIG. 3. The method 900 shown in FIGS. 9A and 9B is provided by way of example, as there are a variety of ways to carry out the method. Additionally, while the example method 900 is illustrated with a particular order of steps, those of ordinary skill in the art will appreciate that FIGS. 9A and 9B and the modules shown therein can be executed in any order and can include fewer or more modules than illustrated.

At step 902, a first plurality of independent waveforms is generated. The waveforms can be generated by an applicable module for generating radar signals, such as the signal generator(s) 304 described herein. Further, the waveforms can be generated using an applicable technique for generating radar signals, such as the techniques described herein with respect to the signal generator(s) 304.

At step 904, the first plurality of independent waveforms is converted into a first plurality of independent transmitted radar signals. The waveforms can be converted into independent transmitted radar signals by an applicable module for processing radar signals into transmitted radar signals, such as the signal converter(s) 306 described herein. Further, the waveforms can be converted into the plurality of independent transmitted radar signals using an applicable technique for processing signals to generate transmitted radar signals, such as the techniques described herein with respect to the signal convertor(s) 306.

At step 906, the first plurality of independent transmitted radar signals are transmitted towards a field of view using a transmitting array comprising a first plurality of transmitter antennas. The first plurality of independent transmitted radar signals can be transmitted using an applicable transmitter array, such as the transmitter antenna array 308 described herein. Further, the independent transmitted radar signals can be transmitted using an array according to an applicable technique for transmitting radar signals, such as the techniques described herein with respect to the transmitter antenna array 308. For example, the independent transmitted radar signals can be transmitted according to a MIMO control scheme.

At step 908, a second plurality of receive radar signals are received using a receive array comprising a second plurality of antennas. Specifically, the receive radar signals can represent responses to the first plurality of independent transmitted radar signals from the field of view. The second plurality of receive radar signals can be received using an applicable receiver array, such as the receiver antenna array 310 described herein. Further, the second plurality of receive radar signals can be received according to an applicable technique for receiving radar signals, such as the techniques described herein with respect to the receiver antenna array 310. For example, the second plurality of receive radar signals can be received according to a MIMO control scheme.

At step 910, the second plurality of receive radar signals are processed to recover one or more signal attributes of the first plurality of independent waveforms from the second plurality of receive radar signals. As noted herein, the one or more signal attributes may correspond to responses to at least a portion of the field of view. This operation may involve combining the second plurality of receive radar signals to form a combined receive radar signal for the field of view. The receive radar signals can be processed and/or combined using an applicable module for combining receive radar signals, such as the virtual antenna formation module 314 described herein. Further, the receive radar signals can be combined using an applicable technique for combining received radar signals, such as the techniques described herein with respect to the virtual antenna formation module 314.

At step 912, a representation of one or more areas of interest in the field of view is provided using one or more signal attributes. This operation could, e.g., use a combined receive radar signal. The representation of the one or more areas of interest can be provided from the combined receive radar signal using an applicable module for providing representations of areas of interest in a field of view using radar, such as the imaging module 316 described herein. Further, the representation of the one or more areas of interest can be provided using an applicable technique for providing representations of areas of interest in a field of view using radar, such as the techniques described herein with respect to the imaging module 316.

At step 914, one or more image attributes of the one or more areas of interest are rendered using the representation of the one or more areas of interest. The attributes of the areas of interest can be rendered using an applicable module for rendering attributes of one or more areas of interest in a field of view using radar, such as the imaging module 316 described herein. Further, the attributes of the areas of interest can be rendered using an applicable technique for rendering image attributes of an area of interest through a representation of the area of interest generated using radar, such as the techniques described herein with respect to the imaging module 316. As noted herein, one or more image attributes may be based on motion relative to the field of view, including for instance, motion toward or away from a field of view. The image attributes may comprise angle values, range values, relative velocity values, or some combination thereof, of voxels forming the representation of the field of view. The image attributes may be derived from scene measurements comprising fast time data, slow time data, spatial data, or some combination thereof, of the field of view. In some embodiments, spatial data of the field of view may be transformed into angle values of the image attributes. Step 914 may include transforming fast time data of the field of view into range values of the image attributes. Slow time data may be transformed into relative velocity values of the image attributes. In some embodiments, cell migration due to velocity measurements affecting range measurements or range measurements affecting velocity measurements may be corrected. Slow time data may be rescaled in light of fast time values of the field of view. In some embodiments, a Keystone transformation is performed on slow time data of the field of view.

At optional steps 916 and 918, instructions are provided to manage a vehicle based on the representation of the one or more areas of interest in the field of view and it is determined whether the areas of interest include an object based on the representation. For example, it can be determined whether an object is an area of interest in a field of view of a vehicle. Subsequently, the vehicle can be controlled based on whether the object is within the area of interest in the field of view. The instruction to manage a vehicle can be generated by an applicable module for providing instructions to manage a vehicle based on a representation of an area of interest in a field of view, such as the vehicle management module(s) 320 described herein. Further, whether the areas of interest include an object can be determined based on the representation of the areas of interest using an applicable module for detecting objects in an area of interest, such as the imaging module 316 and the object detection module(s) 318 described herein.

The discussion now turns to sources of error in the systems and techniques described herein. Specifically, there are a variety of sources of error that can arise during the manufacturing, installation, and operation of the systems described here. If any of these errors are significant enough to introduce errors into the imaging operation, then they can be measured and corrected for by performing calibration. In general, the errors in the systems described herein arise from a variety of causes but all result in either or both an unwanted amplitude offset between transmit-receive antenna pairs and an unwanted phase offset between transmit-receive antenna pairs.

Amplitude and phase errors are introduced in a variety of ways. These include varying amplifier gains as a function of temperature, varying signal path losses as a function of temperature, variances in antenna size, shape and position due to antenna manufacturing tolerances, additional gain and phase offsets occurring due to the different signal path lengths of different channels due to circuit routing constraints, static errors in array geometry due to mechanical tolerances introduced in manufacturing or installation in a target platform, e.g. a vehicle, and dynamic errors introduced by mechanical movement within the target platform, e.g. vibrations caused when a vehicle moves.

Some of these sources of error are relatively constant over the life of the system. For example phase and amplitude errors resulting from different signal path lengths remain constant over the life of the system. Additionally, the length of printed circuit board signal path traces will have initial error due to manufacturing tolerances but will typically not change. Conversely, other sources of error, such as temperature-dependent amplifier gains or array deformation due to target platform vibration, vary during the operation of the device. The following described a calibration procedure that accounts for both the long-term stable and short-term dynamic sources of error and can be implemented in the systems described herein.

The image formation processes described herein can be implemented using the backpropagation method. As explained, this technique relies on summing signals contributed from each transmit-receive pair in phase. In one embodiment, the systems described herein are designed to operate with a carrier frequency of 76-77 GHz. This corresponds to a wavelength of 4 mm. Thus, a one-degree phase offset corresponds to a linear distance of only 11 micrometers. The calibration process described here is designed to compensate for phase errors, e.g. to give a resulting accuracy on the order of 1 degree.

An additional source of error is unwanted direct coupling between transmit and receive antennas. Because the systems described herein use one or more antenna arrays with closely-spaced antenna elements, direct coupling between transmit and receive produces a very short signal path. In turn, as frequency-modulated continuous wave (FMCW) modulation can be utilized for ranging, a short signal path results in a low-frequency IF signal after demodulation. Because the cross-coupled signal paths are much shorter than the normal operating range of the systems described herein, the cross-coupled signal paths can produce IF signals at a much lower frequency than the desired round-trip signal paths. Accordingly, these frequencies may be effectively filtered out using linear filters. This filtering can be implemented using analog circuit elements before digitization, with a digital filter after sampling, or with both.

Further, because all of the above-described sources of error result in unwanted per-channel amplitude or phase offset, the error is a linear operation applied to received signals that can be quantified in a square matrix. As used herein, this square matrix is referred to as an error matrix. If the system contains $N_{Tx}$ transmitters and $N_{Rx}$ receivers, this is a square matrix with $N_{Tx} \times N_{Rx}$ entries. The values in the matrix are complex numbers, so they can describe both amplitude and a phase error. The diagonal of this matrix models the gain and phase offsets of a single Tx-Rx signal path with respect to a constant reference. If, for example, call the path from transmitter #1 to receiver #1 "channel 1" and take it as the reference. Then the cell in the matrix for channel 1 has the value of 1.0, and the value of all other cells along the diagonal of the matrix contain the values of amplitude and phase offset relative to channel 1.

Off-diagonal cells in the error matrix correspond to the effects of antenna coupling between channels. Specifically, it can be assumed that antenna cross-coupling is negligible due to filtering out low-frequency IF signals. Hence, the error matrix can be represented as a diagonal matrix.

Therefore, the calibration process includes measurements to obtain this diagonal error matrix. The error matrix can be identified by scanning a known reference target within the sensor field of view. For example, a sensor mounted on a car could have a view of the hood, and there could be a fixed reference target placed there. The error matrix can be obtained by measuring the amplitude and phases of the reference target, which is located at a known position. The actual signals from all transmit to receive channels can be compared to the signals that would be expected from an array with no errors, that is imaged at a target at the known reference position. The per-channel differences between the amplitudes and the phases of the measured and expected waves can then form the diagonal entries of the error matrix.

In another embodiment, the calibration does not use a reference target at a known position. Instead, a target is chosen at an unknown position in the field of view. First, an imaging process is performed with an uncalibrated array or using the last known valid calibration. Next, a target is chosen from that image. This target could be chosen by for example locating the voxels with the highest-intensity reflection, voxels at a particularly favorable distance, or voxels that have a desirable amount of contrast with neighboring voxels. Finally, an optimization process is run. This optimization solves for the error matrix that produces the smallest, sharpest image of the selected target. An applicable image optimization method can be utilized to produce the smallest and sharpest image of the selected target, such as leas squares optimization, can be used.

Once the error matrix is generated it can be applied to correct recorded waveform data. Specifically, the input to the image formation techniques described earlier can be the sampled waveform from each transmit to receive signal path. The error matrix diagonal contains an entry for each of these signal paths, so the amplitude and phase offset from a corresponding entry is applied to the sampled signal to produce a corrected signal. The corrected signals from all channels are then fed into the imaging algorithm and back-propagation is run as described before.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A radar imaging system comprising:
a plurality of antenna elements spatially distributed to form a sparse antenna array orthogonal to a range dimension of the radar imaging system, wherein the plurality of antenna elements are configured to transform a plurality of independent radar signals for a field of view; and
an image processing system coupled to the plurality of antenna elements and comprising one or more processors and memory, wherein the memory is configured to store computer-program instructions that, when executed by the one or more processors, cause the radar imaging system to:
recover interaction information gained from interaction of the plurality of independent radar signals with the field of view;
decouple relative velocity data from range data in the interaction information;
use the interaction information to identify radar imaging data about the field of view; and form one or more three-dimensional (3D) voxels of the field of view using the radar imaging data.

2. The radar imaging system of claim 1, wherein the computer-program instructions of the image processing system, when executed by the one or more processors, cause the radar imaging system to further assign range information to the one or more 3D voxels using the radar imaging data.

3. The radar imaging system of claim 1, wherein the radar imaging data comprises range data, spatial data, relative velocity data related to velocity relative to the radar imaging system, or some combination thereof.

4. The radar imaging system of claim 1, wherein the radar imaging data comprises material data about material properties within the field of view.

5. The radar imaging system of claim 1, wherein the interaction data comprises information about relative motion between the radar imaging system and one or more objects within the field of view.

6. The radar imaging system of claim 1, wherein the interaction data comprises fast time data, spatial data, slow time data, or some combination thereof.

7. The radar imaging system of claim 1, wherein using the interaction information to identify radar imaging data comprises accommodating relative motion between the radar imaging system and the field of view.

8. The radar imaging system of claim 1, wherein:
the computer-program instructions, when executed by the one or more processors, cause the radar imaging system to:
gather responses of each transmit-receive antenna combination in the plurality of antenna elements;
perform a summation of the responses before forming the one or more 3D voxels of the field of view.

9. The radar imaging system of claim 1, wherein:
the computer-program instructions, when executed by the one or more processors, cause the radar imaging system to:
gather responses of each transmit-receive antenna combination in the plurality of antenna elements;
derive a plurality of intensity values for a corresponding plurality of voxels using the responses of each transmit-receive antenna combination in the plurality of antenna elements, wherein the plurality of voxels correspond to a plurality of points of interest within the field of view;
form the one or more 3D voxels of the field of interest using the plurality of intensity values.

10. The radar imaging system of claim 1, wherein:
the computer-program instructions, when executed by the one or more processors, cause the radar imaging system to:
perform a first scan of the field of view at a first resolution to determine whether there are areas of interest in the field of view;
perform, in response to the first scan, a second scan of one or more areas of interest in the field of view at a second resolution, wherein the second resolution is greater than the first resolution.

11. The radar imaging system of claim 1, wherein:
the computer-program instructions, when executed by the one or more processors, cause the radar imaging system to:
perform a first scan of the field of view at a first resolution to determine whether there are areas of interest containing objects in the field of view;
perform, in response to the first scan, a second scan of one or more areas of interest in the field of view at a second resolution, wherein the second resolution is greater than the first resolution.

12. The radar imaging system of claim 1, wherein:
the computer-program instructions, when executed by the one or more processors, cause the radar imaging system to:
identify one or more differences in the interaction of the plurality of independent radar signals with the field of view; and
use the one or more differences to focus the 3D voxels of the field of view in a cross-range dimension orthogonal to the range dimension of the radar imaging system.

13. The radar imaging system of claim 1, wherein:
the computer-program instructions, when executed by the one or more processors, cause the radar imaging system to:
identify one or more differences in the interaction of the plurality of independent radar signals with the field of view; and
use the one or more differences to focus the 3D voxels of the field of view in a cross-range dimension orthogonal to the range dimension of the radar imaging system;
wherein the one or more differences comprise one or more of frequency differences or phase differences in the interaction of the plurality of independent radar signals with the field of view.

14. The radar imaging system of claim 1, wherein the computer-program instructions of the image processing system, when executed by the one or more processors, cause the radar imaging system to correct for cell migration in the interaction data.

15. The radar imaging system of claim 1, wherein the computer-program instructions of the image processing system, when executed by the one or more processors, cause the radar imaging system to:
perform a data correction comprising a use of first data in the interaction information to correct second data in the interaction information; and
calibrate the radar imaging data using the data correction.

16. The radar imaging system of claim 1, wherein the computer-program instructions of the image processing system, when executed by the one or more processors, cause the radar imaging system to:
perform a data correction comprising a use of relative velocity data in the interaction information to correct a spatial dimension of the interaction information; and
calibrate the radar imaging data using the data correction.

17. The radar imaging system of claim 1, wherein the computer-program instructions of the image processing system, when executed by the one or more processors, cause the radar imaging system to rescale a slow-time dimension or a fast-time dimension of the radar imaging data.

18. The radar imaging system of claim 1, wherein the computer-program instructions of the image processing system, when executed by the one or more processors, cause the radar imaging system to: rescale a slow-time dimension of the radar imaging data using a Keystone transformation to decouple the slow-time dimension from the fast time dimension in the interaction information.

19. The radar imaging system of claim 1, wherein the computer-program instructions of the image processing system, when executed by the one or more processors, cause the radar imaging system to: store the interaction information, the radar imaging data, or some combination thereof in space-time data structures.

20. The radar imaging system of claim 1, wherein the radar imaging system is configured to assist an autonomous vehicular system with guidance, detection of objects within the field of view, or some combination thereof.

21. The radar imaging system of claim 1, wherein the radar imaging system is configured to assist an aerial vehicle with guidance, detection of objects within the field of view, or some combination thereof.

22. The radar imaging system of claim 1, wherein the radar imaging system is configured to assist a guidance system.

23. The radar imaging system of claim 1, wherein the radar imaging system is configured to assist a detection system.

24. A radar imaging system comprising:
means for transforming a plurality of independent radar signals for a field of view, wherein the means for transforming comprise a sparse antenna array orthogonal to a range dimension of the radar imaging system;
an image processing system coupled to the plurality of antenna elements and comprising one or more processors and memory, wherein the memory is configured to store computer-program instructions that, when executed by the one or more processors, cause the radar imaging system to:
recover interaction information gained from interaction of the plurality of independent radar signals with the field of view;
decouple relative velocity data from range data in the interaction information
use the interaction information to identify radar imaging data about the field of view; and
form one or more three-dimensional (3D) voxels of the field of view using the radar imaging data.

25. A radar imaging system comprising:
a plurality of antenna elements spatially distributed to form a sparse antenna array orthogonal to a range dimension of the radar imaging system, wherein the plurality of antenna elements are configured to transform a plurality of independent radar signals for a field of view; and
an image processing system coupled to the plurality of antenna elements and comprising one or more processors and memory, wherein the memory is configured to store computer-program instructions that, when executed by the one or more processors, cause the radar imaging system to:
recover interaction information gained from interaction of the plurality of independent radar signals with the field of view;
use the interaction information to identify radar imaging data about the field of view;
rescale a slow-time dimension or a fast-time dimension of the radar imaging data; and
form one or more three-dimensional (3D) voxels of the field of view using the radar imaging data.

26. A radar imaging system of claim 25, wherein the computer-program instructions of the image processing system, when executed by the one or more processors, cause the radar imaging system to further assign range information to the one or more 3D voxels using the radar imaging data.

27. The radar imaging system of claim 25, wherein the radar imaging data comprises range data, spatial data, relative velocity data related to velocity relative to the radar imaging system, or some combination thereof.

28. The radar imaging system of claim 25, wherein the radar imaging data comprises material data about material properties within the field of view.

29. The radar imaging system of claim 25, wherein the interaction data comprises information about relative motion between the radar imaging system and one or more objects within the field of view.

30. The radar imaging system of claim 25, wherein the interaction data comprises fast time data, spatial data, slow time data, or some combination thereof.

31. The radar imaging system of claim 25, wherein using the interaction information to identify radar imaging data comprises accommodating relative motion between the radar imaging system and the field of view.

32. The radar imaging system of claim 25, wherein:
the computer-program instructions, when executed by the one or more processors, cause the radar imaging system to:
gather responses of each transmit-receive antenna combination in the plurality of antenna elements;
perform a summation of the responses before forming the one or more 3D voxels of the field of view.

33. The radar imaging system of claim 25, wherein:
the computer-program instructions, when executed by the one or more processors, cause the radar imaging system to:
gather responses of each transmit-receive antenna combination in the plurality of antenna elements;
derive a plurality of intensity values for a corresponding plurality of voxels using the responses of each transmit-receive antenna combination in the plurality of antenna elements, wherein the plurality of voxels correspond to a plurality of points of interest within the field of view;
form the one or more 3D voxels of the field of interest using the plurality of intensity values.

34. The radar imaging system of claim 25, wherein:
the computer-program instructions, when executed by the one or more processors, cause the radar imaging system to:
perform a first scan of the field of view at a first resolution to determine whether there are areas of interest in the field of view;
perform, in response to the first scan, a second scan of one or more areas of interest in the field of view at a second resolution, wherein the second resolution is greater than the first resolution.

35. The radar imaging system of claim 25, wherein:
the computer-program instructions, when executed by the one or more processors, cause the radar imaging system to:
perform a first scan of the field of view at a first resolution to determine whether there are areas of interest containing objects in the field of view;
perform, in response to the first scan, a second scan of one or more areas of interest in the field of view at a second resolution, wherein the second resolution is greater than the first resolution.

36. The radar imaging system of claim 25, wherein:
the computer-program instructions, when executed by the one or more processors, cause the radar imaging system to:
identify one or more differences in the interaction of the plurality of independent radar signals with the field of view; and
use the one or more differences to focus the 3D voxels of the field of view in a cross-range dimension orthogonal to the range dimension of the radar imaging system.

37. The radar imaging system of claim 25, wherein:

the computer-program instructions, when executed by the one or more processors, cause the radar imaging system to:

identify one or more differences in the interaction of the plurality of independent radar signals with the field of view; and use the one or more differences to focus the 3D voxels of the field of view in a cross-range dimension orthogonal to the range dimension of the radar imaging system;

wherein the one or more differences comprise one or more of frequency differences or phase differences in the interaction of the plurality of independent radar signals with the field of view.

38. The radar imaging system of claim 25, wherein the computer-program instructions of the image processing system, when executed by the one or more processors, cause the radar imaging system to correct for cell migration in the interaction data.

39. The radar imaging system of claim 25, wherein the computer-program instructions of the image processing system, when executed by the one or more processors, cause the radar imaging system to:

perform a data correction comprising a use of first data in the interaction information to correct second data in the interaction information; and calibrate the radar imaging data using the data correction.

40. The radar imaging system of claim 25, wherein the computer-program instructions of the image processing system, when executed by the one or more processors, cause the radar imaging system to:

perform a data correction comprising a use of relative velocity data in the interaction information to correct a spatial dimension of the interaction information; and calibrate the radar imaging data using the data correction.

41. The radar imaging system of claim 25, wherein the computer-program instructions of the image processing system, when executed by the one or more processors, cause the radar imaging system to: rescale a slow-time dimension of the radar imaging data using a Keystone transformation to decouple the slow-time dimension from the fast time dimension in the interaction information.

42. The radar imaging system of claim 25, wherein the computer-program instructions of the image processing system, when executed by the one or more processors, cause the radar imaging system to: store the interaction information, the radar imaging data, or some combination thereof in space-time data structures.

43. The radar imaging system of claim 25, wherein the radar imaging system is configured to assist an autonomous vehicular system with guidance, detection of objects within the field of view, or some combination thereof.

44. The radar imaging system of claim 25, wherein the radar imaging system is configured to assist an aerial vehicle with guidance, detection of objects within the field of view, or some combination thereof.

45. The radar imaging system of claim 25, wherein the radar imaging system is configured to assist a guidance system.

46. The radar imaging system of claim 25, wherein the radar imaging system is configured to assist a detection system.

* * * * *